United States Patent
Droz et al.

(10) Patent No.: US 11,838,689 B2
(45) Date of Patent: Dec. 5, 2023

(54) ROTATING LIDAR WITH CO-ALIGNED IMAGER

(71) Applicant: Waymo LLC, Mountain view, CA (US)

(72) Inventors: Pierre-Yves Droz, Los Altos, CA (US); Simon Verghese, Mountain View, CA (US); Brendan Hermalyn, San Francisco, CA (US)

(73) Assignee: Waymo LLC, Mountain view, CA (US)

( * ) Notice: Subject to any disclaimer, the term of this patent is extended or adjusted under 35 U.S.C. 154(b) by 0 days.

(21) Appl. No.: 17/959,170

(22) Filed: Oct. 3, 2022

(65) Prior Publication Data

US 2023/0032410 A1 Feb. 2, 2023

Related U.S. Application Data

(63) Continuation of application No. 17/187,775, filed on Feb. 27, 2021, now Pat. No. 11,470,284, which is a
(Continued)

(51) Int. Cl.
*G01S 17/86* (2020.01)
*H04N 7/18* (2006.01)
(Continued)

(52) U.S. Cl.
CPC ........... *H04N 7/183* (2013.01); *G01S 7/4812* (2013.01); *G01S 7/4817* (2013.01); *G01S 17/86* (2020.01);
(Continued)

(58) Field of Classification Search
CPC .............. B60R 1/00; B60R 2300/101; B60R 2300/301; G01S 17/86; G01S 17/87;
(Continued)

(56) References Cited

U.S. PATENT DOCUMENTS

| 7,319,777 | B2 | 1/2008 | Morcom |
| 7,363,157 | B1 | 4/2008 | Hanna |

(Continued)

FOREIGN PATENT DOCUMENTS

| EP | 2388615 A1 | 11/2011 |
| EP | 2442134 A1 | 4/2012 |

(Continued)

OTHER PUBLICATIONS

Barber, D., Mills, J., and Bryan, P.G .; "Laser Scanning and Photogrammetry—21st Century Metrology"; International Archives of Photogrammetry Remote Sensing and Spatial Information Sciences; vol. 34(5/C7), pp. 360-366; Sep. 2001; Postdam, Germany.

(Continued)

*Primary Examiner* — Behrooz M Senfi
(74) *Attorney, Agent, or Firm* — Lowenstein Sandler LLP

(57) ABSTRACT

Example implementations are provided for an arrangement of co-aligned rotating sensors. One example device includes a light detection and ranging (LIDAR) transmitter that emits light pulses toward a scene according to a pointing direction of the device. The device also includes a LIDAR receiver that detects reflections of the emitted light pulses reflecting from the scene. The device also includes an image sensor that captures an image of the scene based on at least external light originating from one or more external light sources. The device also includes a platform that supports the LIDAR transmitter, the LIDAR receiver, and the image sensor in a particular relative arrangement. The device also includes an actuator that rotates the platform about an axis to adjust the pointing direction of the device.

21 Claims, 11 Drawing Sheets

Related U.S. Application Data continuation of application No. 16/592,541, filed on Oct. 3, 2019, now Pat. No. 10,951,864, which is a continuation of application No. 15/671,845, filed on Aug. 8, 2017, now Pat. No. 10,447,973.

(51) Int. Cl.

| | | |
|---|---|---|
| *G01S 7/481* | (2006.01) | |
| *G01S 17/931* | (2020.01) | |
| *H04N 23/60* | (2023.01) | |
| *H04N 23/69* | (2023.01) | |
| *G01S 17/87* | (2020.01) | |
| *G01S 17/89* | (2020.01) | |
| *B60R 1/00* | (2022.01) | |

(52) U.S. Cl.
CPC .............. *G01S 17/87* (2013.01); *G01S 17/89* (2013.01); *G01S 17/931* (2020.01); *H04N 23/60* (2023.01); *H04N 23/69* (2023.01); *B60R 1/00* (2013.01); *B60R 2300/101* (2013.01); *B60R 2300/301* (2013.01)

(58) Field of Classification Search
CPC ...... G01S 17/89; G01S 17/931; G01S 7/4812; G01S 7/4817; H04N 23/60; H04N 23/69; H04N 7/183
USPC .......................................................... 348/148
See application file for complete search history.

(56) References Cited

U.S. PATENT DOCUMENTS

| | | | |
|---|---|---|---|
| 7,544,945 B2 | 6/2009 | Tan | |
| 8,965,677 B2 | 2/2015 | Breed | |
| 9,036,134 B2 | 5/2015 | Steffey | |
| 9,310,197 B2 | 4/2016 | Gogolla | |
| 9,369,689 B1 | 6/2016 | Tran | |
| 9,420,203 B2 | 8/2016 | Broggi | |
| 9,618,620 B2 | 4/2017 | Zweigle | |
| 9,625,582 B2 | 4/2017 | Gruver | |
| 10,048,358 B2 | 8/2018 | Berger | |
| 10,120,079 B2 | 11/2018 | Pennecot | |
| 10,359,507 B2 | 7/2019 | Berger | |
| 10,447,973 B2 | 10/2019 | Droz | |
| 10,520,592 B2 | 12/2019 | Droz | |
| 10,951,864 B2 | 3/2021 | Droz | |
| 2010/0121577 A1* | 5/2010 | Zhang ................... G06F 18/256 382/104 |
| 2010/0157280 A1 | 6/2010 | Kusevic | |
| 2011/0040427 A1 | 2/2011 | Ben-Tzvi | |
| 2012/0081544 A1 | 4/2012 | Wee | |
| 2013/0226344 A1 | 8/2013 | Wong | |
| 2014/0350834 A1 | 11/2014 | Turk | |
| 2015/0369565 A1 | 12/2015 | Kepler | |
| 2016/0047896 A1 | 2/2016 | Dussan | |
| 2016/0073023 A1 | 3/2016 | Rondinelli | |
| 2016/0137126 A1* | 5/2016 | Fürsich ................. B60R 1/00 348/148 |
| 2016/0266256 A1* | 9/2016 | Allen ..................... G01C 21/26 |
| 2016/0267669 A1 | 9/2016 | Justice | |
| 2016/0274589 A1 | 9/2016 | Templeton | |
| 2016/0282453 A1 | 9/2016 | Pennecot | |
| 2016/0282468 A1 | 9/2016 | Gruver | |
| 2016/0291134 A1* | 10/2016 | Droz ..................... G01S 7/4817 |
| 2017/0061632 A1* | 3/2017 | Lindner ................ G01S 7/4972 |
| 2017/0090032 A1 | 3/2017 | Ridderbusch | |
| 2017/0195568 A1 | 7/2017 | Leizerovich, Jr | |
| 2017/0289515 A1* | 10/2017 | Li ........................ H04N 23/743 |
| 2018/0113200 A1 | 4/2018 | Steinberg | |
| 2018/0164439 A1 | 6/2018 | Droz | |
| 2018/0188359 A1 | 7/2018 | Droz | |
| 2018/0255307 A1* | 9/2018 | Douady-Pleven ... H04N 19/423 |
| 2018/0267148 A1 | 9/2018 | Buettner | |
| 2019/0011544 A1 | 1/2019 | Gassend | |
| 2019/0018416 A1 | 1/2019 | Gassend | |
| 2020/0327378 A1 | 10/2020 | Smith | |

FOREIGN PATENT DOCUMENTS

| | | | |
|---|---|---|---|
| KR | 1020140006462 | | 1/2014 |
| WO | 2014168851 A1 | | 10/2014 |
| WO | 2016047847 A1 | | 3/2016 |
| WO | WO-2016092537 A1 * | 6/2016 | ............. G01S 17/18 |

OTHER PUBLICATIONS

Stone, W. C., Juberts, M., Dagalakis, N., Sntone, J., Gorman, J., Bond, P.J., and Bement, A. L.; "Performance Analysis of Next-Generation LADAR for Manufacturing, Construction, and Mobility"; National Institute of Standards and Technology Interagency/Internal Report (NISTIR); Report No. 7117; May 2004; Gaithersburg, Maryland, United States of America.

International Search Report and Written Opinion for PCT/US2018/042076, dated Dec. 7, 2018.

European Examination Report, Application No. 18842964.1, Communication pursuant to Article 94(3), dated Feb. 11, 2022, 8 pages.

European Examination Report, Application No. 18842964.1, Communication pursuant to Article 94(3), dated Aug. 23, 2022, 6 pages.

China National Intellectual Property Administration, First Office Action for Application No. 201880063958.1, dated Dec. 23, 2022.

* cited by examiner

ROTATING LIDAR WITH CO-ALIGNED IMAGER

CROSS-REFERENCE TO RELATED APPLICATION

This application is a continuation of U.S. patent application Ser. No. 17/187,775, filed Feb. 27, 2021, which is a continuation of U.S. patent application Ser. No. 16/592,541, filed Oct. 3, 2019, which is a continuation of U.S. patent application Ser. No. 15/671,845, filed Aug. 8, 2017. The foregoing applications are incorporated herein by reference.

BACKGROUND

Active sensors, such as light detection and ranging (LIDAR) sensors, radio detection and ranging (RADAR) sensors, and sound navigation and ranging (SONAR) sensors, among others, can scan an environment by emitting signals toward the environment and detecting reflections of the emitted signals. Passive sensors, such as image sensors and microphones among others, can detect signals originating from sources in the environment.

An example LIDAR sensor can determine distances to environmental features while scanning through a scene to assemble a "point cloud" indicative of reflective surfaces. Individual points in the point cloud can be determined, for example, by transmitting a laser pulse and detecting a returning pulse, if any, reflected from an object in the environment, and then determining a distance to the object according to a time delay between the transmission of the pulse and the reception of its reflection. Thus, a three-dimensional map of points indicative of locations of reflective features in the environment can be generated.

An example image sensor can capture an image of a scene viewable to the image sensor. For instance, the image sensor may include an array of charge-coupled devices (CCDs) or other types of light sensors. Each CCD may receive a portion of light from the scene incident on the array. Each CCD may then output a measure of the amount of light incident on the CCD during an exposure time when the CCD is exposed to the light from the scene. With this arrangement, an image of the scene can be generated, where each pixel in the image indicates one or more values (e.g., colors, etc.) based on outputs from the array of CCDs.

SUMMARY

In one example, a device includes a light detection and ranging (LIDAR) transmitter that emits light pulses toward a scene according to a pointing direction of the device. The device also includes a LIDAR receiver that detects reflections of the emitted light pulses reflecting from the scene. The device also includes an image sensor that captures an image of the scene according to the pointing direction of the device and based on external light originating from one or more external light sources. The device also includes a platform that supports the LIDAR transmitter, the LIDAR receiver, and the image sensor in a particular relative arrangement. The device also includes an actuator that rotates the platform about an axis to adjust the pointing direction of the device.

In another example, a vehicle comprises a light detection and ranging (LIDAR) sensor that includes a transmitter and a receiver. The transmitter emits light pulses toward a scene according to a pointing direction of the LIDAR sensor. The receiver detects reflections of the emitted light pulses propagating from the scene. The vehicle also comprises a camera that captures an image of the scene according to a pointing direction of the camera and based on external light originating from one or more external light sources. The vehicle also comprises a platform that supports the LIDAR sensor and the camera in a particular relative arrangement. The vehicle also comprises an actuator that rotates the platform about an axis to simultaneously change the pointing direction of the LIDAR sensor and the camera according to the particular relative arrangement.

In yet another example, a method involves scanning a scene using a light detection and ranging (LIDAR) sensor. The LIDAR sensor emits light pulses toward the scene and detects reflections of the emitted light pulses from the scene. The method also involves generating an image of the scene using an image sensor that detects external light originating from one or more external light sources. The method also involves rotating a platform that supports the LIDAR sensor and the image sensor in a particular relative arrangement. Rotating the platform comprises simultaneously rotating the LIDAR sensor and the image sensor about an axis.

In still another example, a system comprises means for scanning a scene using a light detection and ranging (LIDAR) sensor. The LIDAR sensor may emit light pulses toward the scene and detect reflections of the emitted light pulses from the scene. The system also comprises means for generating an image of the scene using an image sensor that detects external light originating from one or more external light sources. The system also comprises means for rotating a platform that supports the LIDAR sensor and the image sensor in a particular relative arrangement. Rotating the platform may comprise simultaneously rotating the LIDAR sensor and the image sensor about an axis.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
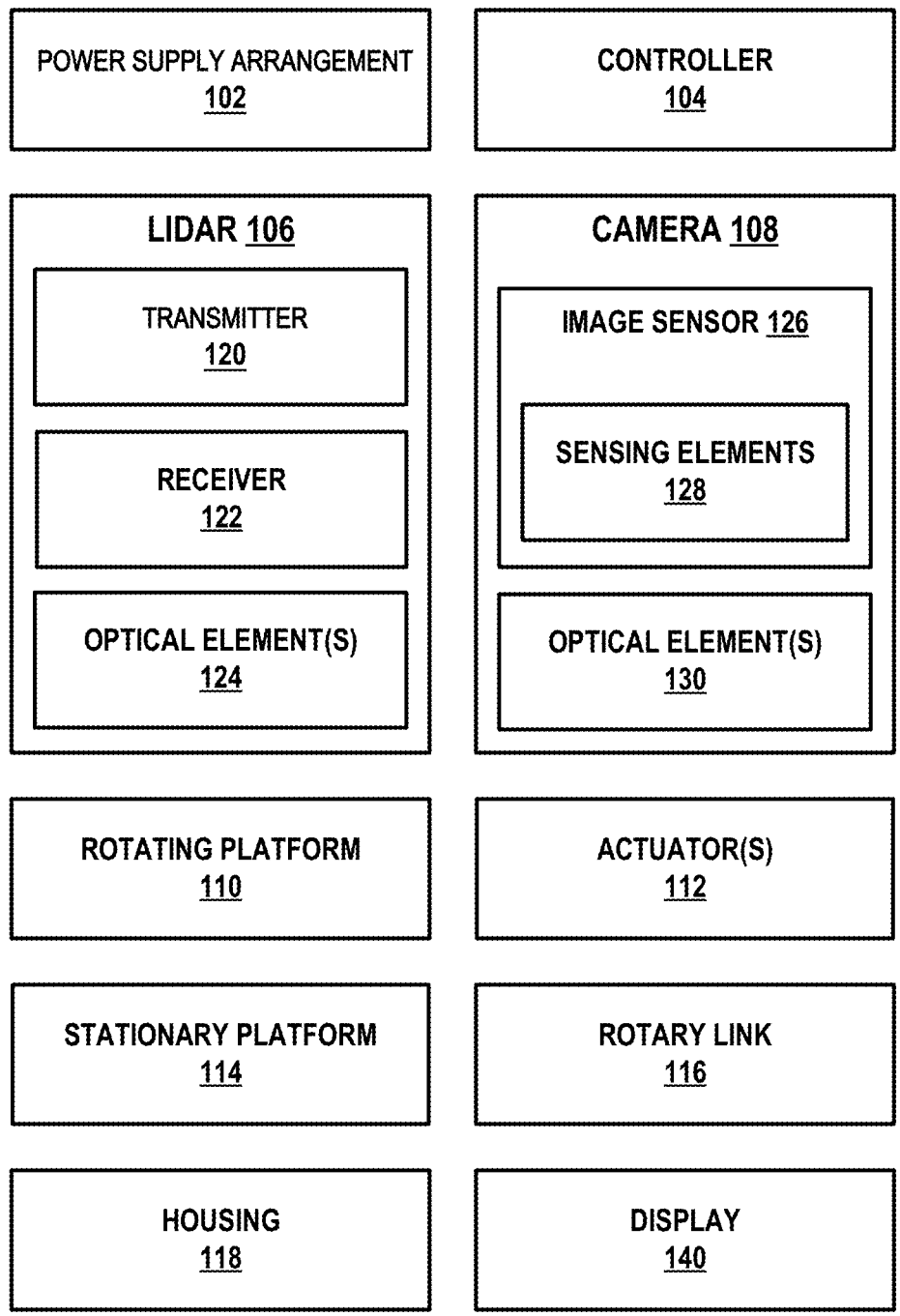
FIG. 1 is a simplified block diagram of a system that includes co-aligned rotating sensors, according to example embodiments.

Exemplary implementations are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein, and illustrated in the figures, can be arranged, substituted, combined, separated, and designed in a wide variety of different configurations.

I. OVERVIEW

Example devices, systems, and methods herein relate to synchronized operation of two or more sensors, such as a LIDAR sensor and an image sensor for instance, that sense a surrounding environment. By way of example, sensor fusion algorithms can be employed to merge data from an image sensor and a LIDAR sensor to generate a 3D representation of a scanned environment. For instance, an example system can be configured to map pixels in one or more images captured by an image sensor to points in a point cloud generated using a LIDAR sensor. With this arrangement, for instance, the 3D representation of the scanned environment may indicate color information determined using the image sensor combined with distance information determined using the LIDAR sensor.

In some scenarios, combining LIDAR data from a spinning LIDAR with image data from an image sensor may involve a variety of technical challenges. Example challenges include synchronizing the timing of photon collection by the two sensors, synchronizing the fields-of-view of the two sensors, and managing different exposure time requirements of the two sensors, among other examples. By way of example, a LIDAR receiver may be configured to detect reflections of an emitted light pulse during an exposure time period of 1 nanosecond. However, in this example, exposure times suitable for an image sensor may range from 1 microsecond to 1 millisecond depending on lighting conditions and scene content in the environment (e.g., daytime conditions, nighttime conditions, etc.). Additionally, if the image sensor is rotated synchronously with the LIDAR sensor (e.g., at 10 Hz), the longer exposure time period of the image sensor may result in image artifacts such as image smearing, etc.

Accordingly, one example device of the present disclosure may include a LIDAR sensor and an image sensor mounted to a rotating platform in a particular relative arrangement. In one implementation, the image sensor may image a scene in an environment of the device through a same lens that focuses light toward a receiver of the LIDAR sensor. In another implementation, the image sensor can be configured as part of a camera that has a camera lens separate from a LIDAR lens that focuses light onto the receiver of the LIDAR sensor.

Regardless of the implementation, in some examples, the image sensor can thus be rotated synchronously with the LIDAR sensor such that respective fields-of-view (FOVs) of the two sensors remain at least partially overlapping in response to the rotation. Alternatively or additionally, the image sensor can be configured to capture image pixels (e.g., by exposing charge-coupled device (CCD) elements, CMOS image sensing elements, active pixel sensor elements, or other sensing elements in the image sensor to external light from the imaged scene) according to emission times and/or detection times of one or more light pulses emitted by the LIDAR sensor.

Through this process, the present method may improve accuracy and/or efficiency of computer operations related to combining sensor data from the two sensors by synchronizing the FOVs of the two sensors and/or the image pixel capture times with the LIDAR light pulse emission/detection times, even while the two sensors are rotating to scan the surrounding environment. By way of example, the device may include a controller that maps the captured image pixels to corresponding points in the point cloud generated using the LIDAR sensor, based on at least the co-aligned FOVs and/or matching times at which the respective data was generated by the two sensors. Alternatively or additionally, an external or remote computing system can receive the sensor data from the device and perform the mapping process remotely.

In some examples, the image sensor can be implemented according to a time-delay-and-integration (TDI) configuration. For instance, the image sensor may include an array of sensing elements (e.g., CCDs, etc.) that provide data for generating image pixels of a captured image.

In one implementation, the image sensor (or the controller) may shift a data frame (e.g., column of pixels) captured by a first column of sensing elements to an adjacent data frame associated with an adjacent second column of sensing elements synchronously with the rotation of the platform that supports the LIDAR sensor and the image sensor. Data captured by the second column of sensing elements (e.g., after a rotation of the platform that causes the position of the second column (relative to the scene) to correspond or be similar to the position of the first column when the shifted data was captured) can then be added to the shifted data frame. To that end, one or more columns of the array of sensing elements may be aligned (e.g., parallel, etc.) with the axis of rotation of the rotating platform. Further, for instance, the image sensor (or controller) may determine a time delay between shifting the columns based on the rate of rotation of the platform.

In another implementation, whether or not the array of sensing elements is aligned with the axis of rotation, the image sensor (or the controller) may combine (e.g., sum) data (e.g., light intensity information, etc.) indicated by a first image pixel captured using a first sensing element to data indicated by a second image pixel captured using a second sensing element (after a time delay from capture of the first image pixel). For instance, the controller may determine that the rotating motion of the platform causes an imaged object in a first image to become distorted in a second image (captured after a time delay) due to the associated change in the pointing direction (e.g., viewpoint, etc.) of the image sensor. Further, such distortion may depend on various factors such as lens characteristics, the position of the image sensor relative to a camera lens, and/or a distance between the imaged object and the device, among other factors. To that end, for instance, the controller may select the second sensing element based on the rate of rotation of the platform, distance information (e.g., from the LIDAR) of the object in the first image pixel relative to the device (e.g., expected pixel location of the imaged object in the second image), and/or other optical characteristics of the device (e.g., focal length of a lens that focuses light onto the image sensor, position of image sensor relative to lens, etc.).

Regardless of the implementation, the image sensor can be configured to capture multiple image pixels representing a particular (same) region of the scene at different times as the device rotates. Further, the image sensor (or the controller) can combine detections of the particular region of the scene (i.e., combine image pixels captured at different times during the rotation) according to the apparent motion of the scene relative to the device as the device rotates.

Through this process, improved sensor data quality (e.g., reduced image smearing and/or other image artifacts associated with the apparent motion of the scene relative to the image sensor during a long exposure time) can be achieved by reducing the exposure times of the sensing elements during individual image (or pixel) captures while the platform is rotating, and combining the individual images (or pixels) to effectively achieve a desired (longer) exposure time.

Additionally, with this arrangement for instance, improved mapping (e.g., sensor fusion, etc.) of sensor data from the LIDAR device and the image sensor can be achieved by synchronizing collection, in the time domain and/or the space domain, of the data from the image sensor and the data from the LIDAR sensor. For instance, the controller of the device may synchronize image pixel capture times with LIDAR light pulse emission and/or detection times, even if the time period between LIDAR light pulse emissions is less than a suitable exposure time for the image sensor.

II. EXAMPLE SENSORS

Although example sensors described herein include LIDAR sensors and cameras (or image sensors), other types of sensors are possible as well. A non-exhaustive list of example sensors that can be alternatively employed herein without departing from the scope of the present disclosure includes RADAR sensors, SONAR sensors, sound sensors (e.g., microphones, etc.), motion sensors, temperature sensors, pressure sensors, etc.

To that end, example sensors herein may include an active range sensor that emits a signal (e.g., a sequence of pulses or any other modulated signal) based on modulated power provided to the sensor, and then detects reflections of the emitted signal from objects in the surrounding environment. Alternatively or additionally, example sensors herein may include passive sensors (e.g., cameras, microphones, antennas, pressure sensors, etc.) that detect external signals (e.g., background signals, etc.) originating from external source(s) in the environment.

Referring now to the figures, FIG. 1 is a simplified block diagram of a system 100 that includes co-aligned rotating sensors, according to an example embodiment. As shown, system 100 includes a power supply arrangement 102, a controller 104, a LIDAR 106, a camera 108, a rotating platform 110, one or more actuators 112, a stationary platform 114, a rotary link 116, a housing 118, and a display 140.

In other embodiments, system 100 may include more, fewer, or different components. For example, system 100 can optionally include one or more sensors (e.g., gyroscopes, accelerometers, encoders, microphones, RADARs, SONARs, thermometers, etc.) in addition to or instead of LIDAR 106 and camera 108. Additionally, the components shown may be combined or divided in any number of ways. For example, LIDAR 106 and camera 108 can alternatively be implemented as a single physical component that includes one or more of the components shown in LIDAR 106 and camera 108. Thus, the functional blocks of FIG. 1 are illustrated as shown only for convenience in description. Other example components, arrangements, and/or configurations are possible as well without departing from the scope of the present disclosure.

Power supply arrangement 102 may be configured to supply, receive, and/or distribute power to various components of system 100. To that end, power supply arrangement 102 may include or otherwise take the form of a power source (e.g., battery cells, etc.) disposed within system 100 and connected to various components of system 100 in any feasible manner, so as to supply power to those components. Additionally or alternatively, power supply arrangement 102 may include or otherwise take the form of a power adapter configured to receive power from one or more external power sources (e.g., from a power source arranged in a vehicle to which system 100 is mounted, etc.) and to transmit the received power to various components of system 100.

Controller 104 may include one or more electronic components and/or systems arranged to facilitate certain operations of system 100. Controller 104 may be disposed within system 100 in any feasible manner. In one embodiment, controller 104 may be disposed, at least partially, within a central cavity region of rotary link 116. In another embodiment, one or more functions of controller 104 can be alternatively performed by one or more physically separate controllers that are each disposed within a respective component (e.g., LIDAR 106, camera 108, etc.) of system 100.

In some examples, controller 104 may include or otherwise be coupled to wiring used for transfer of control signals to various components of system 100 and/or for transfer of data from various components of system 100 to controller 104. Generally, the data that controller 104 receives may include sensor data based on detections of light by LIDAR 106 and/or camera 108, among other possibilities. Moreover, the control signals sent by controller 104 may operate various components of system 100, such as by controlling emission and/or detection of light by LIDAR 106, controlling image capture by camera 108, and/or controlling actuator(s) 112 to rotate rotating platform 110, among other possibilities.

To that end, in some examples, controller 104 may include one or more processors, data storage, and program instructions (stored in the data storage) executable by the one or more processors to cause system 100 to perform the various operations described herein. In some instances, controller 104 may communicate with an external controller or the like (e.g., a computing system arranged in a vehicle, robot, or other mechanical device to which system 100 is mounted) so as to help facilitate transfer of control signals and/or data between the external controller and the various components of system 100.

Additionally or alternatively, in some examples, controller 104 may include circuitry wired to perform the various functions described herein. Additionally or alternatively, in some examples, controller 104 may include one or more special purpose processors, servos, or other types of controllers. For example, controller 104 may include a proportional-integral-derivative (PID) controller or other control loop feedback apparatus that operates actuator(s) 112 to modulate rotation of rotating platform 116 according to a particular frequency or phase. Other examples are possible as well.

LIDAR sensor 106 may include any device configured to scan a surrounding environment by emitting light and detecting reflections of the emitted light. To that end, as shown, LIDAR 106 includes a LIDAR transmitter 120, a LIDAR receiver 122, and one or more optical elements 124.

Transmitter 120 may be configured to transmit light (or other signal) toward an environment of system 100. In one example, transmitter 120 may include one or more light sources that emit one or more light beams and/or pulses having wavelengths within a wavelength range. The wavelength range could, for example, be in the ultraviolet, visible, and/or infrared portions of the electromagnetic spectrum depending on the configuration of the light sources. In some examples, the wavelength range can be a narrow wavelength range, such as provided by lasers and/or some light emitting diodes.

In some examples, the light source(s) in transmitter 120 may include laser diodes, diode bars, light emitting diodes (LEDs), vertical cavity surface emitting lasers (VCSELs), organic light emitting diodes (OLEDs), polymer light emitting diodes (PLEDs), light emitting polymers (LEPs), liquid crystal displays (LCDs), microelectromechanical systems (MEMS), fiber lasers, and/or any other device configured to selectively transmit, reflect, and/or emit light to provide a plurality of emitted light beams and/or pulses.

Receiver 122 may include one or more light detectors (e.g., photodiodes, avalanche photodiodes, etc.) that are arranged to intercept and detect reflections of the light pulses emitted by transmitter 120 and reflected from one or more objects in a surrounding environment of system 100. To that end, receiver 122 may be configured to detect light having wavelengths in the same wavelength range as the light emitted by transmitter 120. In this way, for instance, LIDAR 106 may distinguish reflected light pulses originated by LIDAR 106 from other light in the environment.

In some examples, receiver 122 may include a photodetector array, which may include one or more detectors each configured to convert detected light (e.g., in the wavelength range of light emitted by transmitter 120) into an electrical signal indicative of the detected light. In practice, such a photodetector array could be arranged in one of various ways. For example, the detectors can be disposed on one or more substrates (e.g., printed circuit boards (PCBs), flexible PCBs, etc.) and arranged to detect incoming light that is traveling along the optical path from the optical lens. Also, such a photodetector array could include any feasible number of detectors aligned in any feasible manner.

Additionally, the detectors in the array may take various forms. For example, the detectors may take the form of photodiodes, avalanche photodiodes (e.g., Geiger mode and/or linear mode avalanche photodiodes), silicon photomultipliers (SiPMs), phototransistors, cameras, active pixel sensors (APS), charge coupled devices (CCD), cryogenic detectors, and/or any other sensor of light configured to receive focused light having wavelengths in the wavelength range of the light emitted by transmitter 120.

In some examples, LIDAR 106 can select or adjust a horizontal scanning resolution by changing a rate of rotation of LIDAR 106 and/or adjusting a pulse rate of light pulses emitted by transmitter 120. As a specific example, transmitter 120 can be configured to emit light pulses at a pulse rate of 15,650 light pulses per second. In this example, LIDAR 106 may be configured to rotate at 10 Hz (i.e., ten complete 360° rotations per second). As such, receiver 122 can detect light with a 0.23° horizontal angular resolution. Further, the horizontal angular resolution of 0.23° can be adjusted by changing the rate of rotation of LIDAR 106 or by adjusting the pulse rate. For instance, if LIDAR sensor 106 is instead rotated at 20 Hz, the horizontal angular resolution may become 0.46°. Alternatively, if transmitter 120 emits the light pulses at a rate of 31,300 light pulses per second while maintaining the rate of rotation of 10 Hz, then the horizontal angular resolution may become 0.115°. Other examples are possible as well. Further, in some examples, LIDAR 106 can be alternatively configured to scan a particular range of views within less than a complete 360° rotation of LIDAR 106.

Optical element(s) 124 can be included in or otherwise coupled to transmitter 120 and/or receiver 122. In one example, optical element(s) 124 can be arranged to direct light from a light source in transmitter 120 toward the environment. In another example, optical element(s) 124 can be arranged to focus and/or guide light from the environment toward receiver 122. In yet another example, optical element(s) 124 can be arranged to filter background light incident from the surrounding environment from the focused light directed toward receiver 122. As such, optical element (s) 124 may include any feasible combination of mirrors, waveguides, light filters, lenses, and/or any other optical components arranged to guide propagation of light through physical space and/or adjust certain light characteristics.

In some implementations, optical elements 124 may include at least one mirror arranged to fold an optical path between an optical lens and a photodetector (or light detector) in receiver 122. Each such mirror may be fixed within LIDAR 106 in any feasible manner. Also, any feasible number of mirrors may be arranged for purposes of folding the optical path. For instance, optical elements 124 may include two or more mirrors arranged to fold the optical path two or more times between an optical lens of LIDAR 106 and a light detector array of receiver 122.

In some implementations, optical elements 124 may include a light filter arranged to reduce or prevent light having wavelengths outside the wavelength range of the light emitted by transmitter 120 from propagating toward receiver 122. With such arrangement for instance, the light filter can reduce noise due to background light propagating from the scanned environment and originating from an external light source different than light sources of transmitter 120.

Camera 108 may be any camera (e.g., a still camera, a video camera, etc.) configured to capture images of the environment in which system 100 is located. As shown, camera 108 includes an image sensor 126 and one or more optical elements 130.

Image sensor 126 may include any imaging device that detects and provides data indicative of an image. As shown, image sensor 126 may include an arrangement of light sensing elements 128 that each provide a measure of light waves incident thereon. To that end, sensing elements 128 may include charge-coupled devices (CCDs, active pixel sensors, complementary metal-oxide-semiconductor (CMOS) photodetectors, N-type metal-oxide-semiconductor (NMOS) photodetectors, among other possibilities.

Further, in some examples, data from sensing elements 128 can be combined according to the arrangement of the sensing elements 128 to generate an image. In one example, data from a two-dimensional (2D) array of sensing elements may correspond to a 2D array of image pixels in the image.

Other examples are possible as well (e.g., three-dimensional (3D) arrangement of sensing elements, etc.).

In some examples, a sensing element can optionally include multiple adjacent light detectors, where each detector is configured to detect light having a particular wavelength or wavelength range. For instance, an image pixel may indicate color information (e.g., red-green-blue or RGB) based on a combination of data from a first detector that detects an intensity of red light, a second detector that detects an intensity of green light, and a third detector that detects an intensity of blue light. Other examples are possible as well.

In one embodiment, image sensor 126 may be configured to detect visible light propagating from the scene. Further, in this embodiment, receiver 122 of LIDAR 106 may be configured to detect invisible light (e.g., infrared, etc.) within a wavelength range of light emitted by transmitter 120 of LIDAR 106. In this embodiment, system 100 (or controller 104) can then combine data from LIDAR 106 with data from camera 108 to generate a colored three-dimensional (3D) representation (e.g., point cloud) of the scanned environment.

Optical element(s) 130 may include any combination of optical components such as lenses, mirrors, waveguides, light filters or any other type of optical component similarly to optical element(s) 124. Further, optical elements 130 can be arranged to focus, direct, and/or adjust light characteristics of incident light for propagation toward sensing elements 128. As noted above, for instance, optical elements 130 may include light filters that allow wavelengths of light associated with a particular color (e.g., red, green, blue, etc.) to propagate toward a particular sensing element.

Although not shown, in some implementations, system 100 may include a shared optical element that is employed for both LIDAR 106 and camera 108. For example, a shared lens can be arranged to focus light incident on the shared lens toward receiver 122 of LIDAR 106 and toward image sensor 126. For instance, optical elements 124 and/or 130 may include a selectively or partially reflective surface (e.g., dichroic mirror, half mirror, etc.) that receives focused light from the shared lens, directs a first portion of the focused light toward receiver 122, and directs a second portion of the focused light toward image sensor 126. For instance, a dichroic mirror can be positioned along a path of the focused light, and may have dielectric properties that cause the first portion of the focused light (having wavelengths associated with the emitted light pulses from transmitter 120) toward receiver 122, while transmitting the second portion of the focused light (having other wavelengths such as visible light from the scene, etc.) toward image sensor 126.

Thus, in some examples, fields-of-view (FOVs) of LIDAR 106 and camera 108 may at least partially overlap due to the shared lens. Further, optical element(s) 124 and/or 130 may include one or more optical element(s) (e.g., dichroic mirrors, half mirrors, etc.) that direct a first portion of the focused light (e.g., including reflections of the light emitted by transmitter 120) toward receiver 122, and direct a second portion of the focused light originating from external light sources (e.g., including light having different wavelengths than wavelengths of the emitted light of transmitter 120) toward camera 108. Other implementations are possible as well for simultaneously detecting external light (using camera 108) and reflections of LIDAR-emitted light (using receiver 122).

Further, in some implementations, system 100 may include a LIDAR lens for focusing light onto receiver 122 and a separate camera lens for focusing light onto image sensor 126. Additionally, in some instances, the FOVs of LIDAR 106 and camera 108 can be configured to at least partially overlap even if LIDAR 106 and camera 108 employ separate optical lenses. For example, LIDAR 106 and camera 108 can be configured in a particular relative arrangement (e.g., to have similar or same pointing directions).

Rotating platform 110 may be configured to rotate about an axis. To that end, rotating platform 110 can be formed from any solid material suitable for supporting one or more components mounted thereon. For example, LIDAR 106 (and/or transmitter 120 and receiver 122 thereof) and camera 108 (and/or image sensor 126 thereof) may be supported (directly or indirectly) by rotating platform 110 such that each of these components moves relative to the environment while remaining in a particular relative arrangement in response to rotation of rotating platform 110. In particular, each of these components could be rotated (simultaneously) relative to an axis so that system 100 may obtain information from various directions. In this manner, a pointing direction of system 100 can be adjusted horizontally by actuating rotating platform 110 to different directions.

In order to rotate platform 110 in this manner, one or more actuators 112 may actuate rotating platform 110. To that end, actuators 112 may include motors, pneumatic actuators, hydraulic pistons, and/or piezoelectric actuators, among other possibilities.

With this arrangement, controller 104 could operate actuator 112 to rotate rotating platform 110 in various ways so as to obtain information about the environment. In one example, rotating platform 110 could be rotated in either direction. In another example, rotating platform 110 may carry out complete revolutions such that LIDAR 106 (and camera 108) provides a 360° horizontal FOV of the environment. Moreover, rotating platform 110 may rotate at various frequencies so as to cause system 100 to scan the environment at various refresh rates. In one embodiment, system 100 may be configured to have a refresh rate of 15 Hz (e.g., fifteen complete rotations of the system 100 per second).

Stationary platform 114 may take on any shape or form and may be configured for coupling to various structures, such as to a top of a vehicle for example. Also, the coupling of stationary platform 114 may be carried out via any feasible connector arrangement (e.g., bolts and/or screws). In this way, system 100 could be coupled to a structure so as to be used for various purposes, such as those described herein.

Rotary link 116 directly or indirectly couples stationary platform 114 to rotating platform 110. To that end, rotary link 116 may take on any shape, form and material that provides for rotation of rotating platform 110 about an axis relative to the stationary platform 114. For instance, rotary link 116 may take the form of a shaft or the like that rotates based on actuation from actuator 112, thereby transferring mechanical forces from actuator 112 to rotating platform 110. In one implementation, rotary link 116 may have a central cavity in which one or more components of system 100 may be disposed. In some examples, rotary link 116 may also provide a communication link for transferring data and/or instructions between stationary platform 114 and rotating platform 110 (and/or components thereon such as LIDAR 106, camera 108, etc.).

Housing 118 may take on any shape, form, and material and may be configured to house one or more components of system 100. In one example, housing 118 can be a dome-shaped housing. Further, for example, housing 118 may be composed of a material that is at least partially non-transparent, which may allow for blocking of at least some light from entering the interior space of housing 118 and thus help mitigate thermal and noise effects of ambient light on one or more components of system 100. Other configurations of housing 118 are possible as well.

In some implementations, housing 118 may be coupled to rotating platform 110 such that housing 118 is configured to rotate about the above-mentioned axis based on rotation of rotating platform 110. In one implementation, LIDAR 106, camera 108, and possibly other components of system 100 may each be disposed within housing 118. In this manner, LIDAR 106 and camera 108 may rotate together with housing 118.

In some implementations, although not shown, system 100 can optionally include multiple housings similar to housing 118 for housing certain sub-systems or combinations of components of system 100. For example, system 100 may include a first housing for LIDAR 106 and a separate housing for camera 108. In this example, LIDAR 106 and camera 108 (and their respective housings) may still be mounted on or otherwise supported by rotating platform 110. Thus, rotating platform 110 can still simultaneously rotate both sensors 106 and 108 in a particular relative arrangement, even if sensors 106 and 108 are physically implemented in separate housings. Other examples are possible as well.

Display 140 can optionally be included in system 100 to display information about one or more components of system 100. For example, controller 104 may operate display 140 to display images captured using camera 108, a representation (e.g., 3D point cloud, etc.) of an environment of system 100 indicated by LIDAR data from LIDAR 106, and/or a representation of the environment based on a combination of the data from LIDAR 106 and camera 108 (e.g., colored point cloud, etc.). To that end, display 140 may include any type of display (e.g., liquid crystal display, LED display, cathode ray tube display, projector, etc.). Further, in some examples, display 140 may have a graphical user interface (GUI) for displaying and/or interacting with images captured by camera 108, LIDAR data captured using LIDAR 106, and/or any other information about the various components of system 100 (e.g., power remaining via power supply arrangement 102). For example, a user can manipulate the GUI to adjust a scanning configuration of LIDAR 106 and/or camera 108 (e.g., scanning refresh rate, scanning resolution, etc.).

As noted above, system 100 may alternatively include additional, fewer, or different components than those shown. For example, although system 100 is shown to include LIDAR 106 and camera 108, system 100 can alternatively include additional co-aligned rotating sensors, and/or different (e.g., RADARs, microphones, etc.) types of sensors. Further, it is noted that the various components of system 100 can be combined or separated into a wide variety of different arrangements. For example, although LIDAR 106 and camera 108 are illustrated as separate components, one or more components of LIDAR 106 and camera 108 can alternatively be physically implemented within a single device (e.g., one device that includes transmitter 120, receiver 122, sensing elements 128, etc.). Thus, this arrangement of system 100 is described for exemplary purposes only and is not meant to be limiting.

Figure 2:
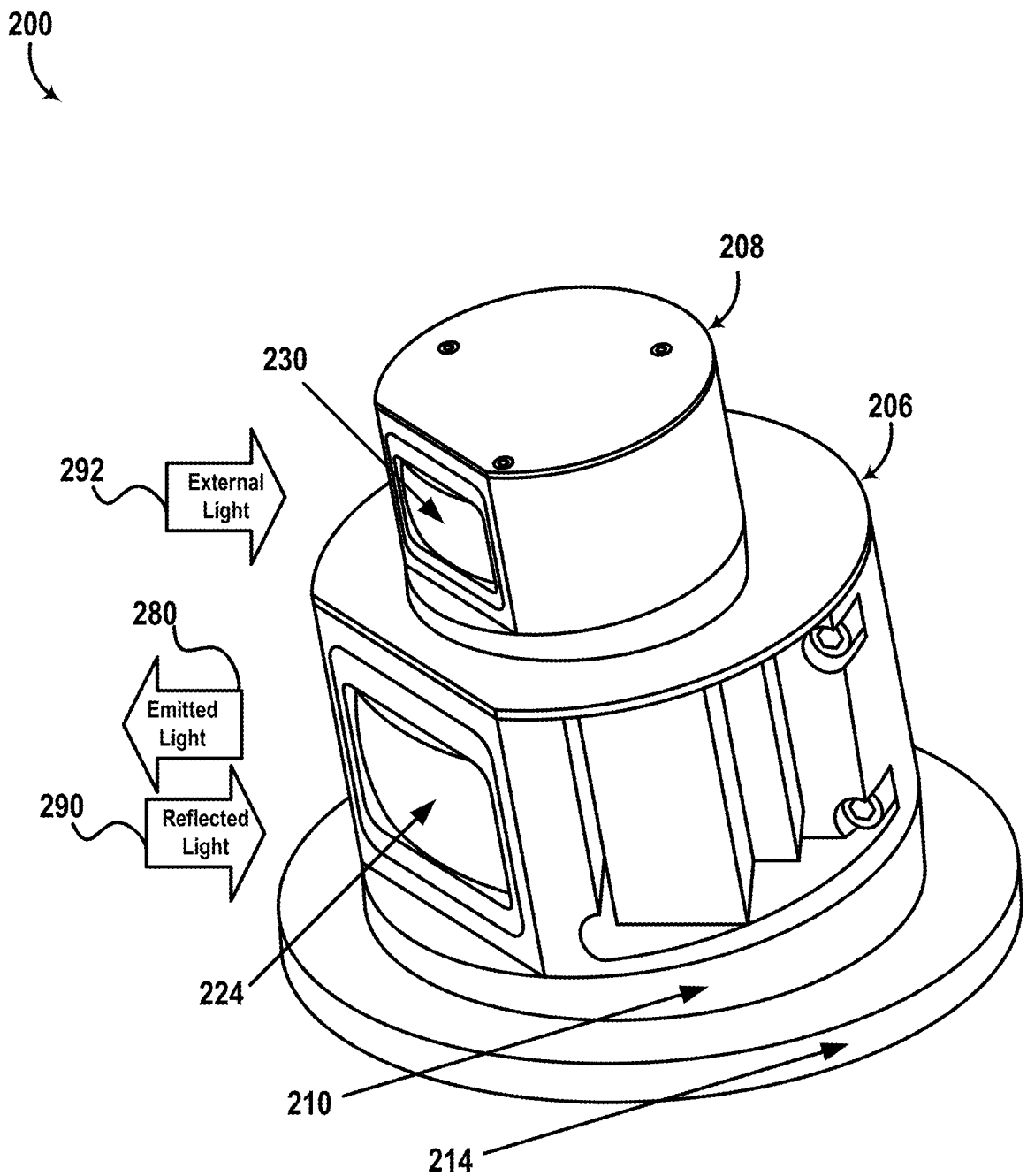
FIG. 2 illustrates a device that includes co-aligned rotating sensors, according to example embodiments.

FIG. 2 illustrates a device 200 that includes co-aligned rotating sensors, according to example embodiments. As shown, device 200 includes a LIDAR 206, a camera 208, a rotating platform 210, and a stationary platform 214, a LIDAR lens 224, and a camera lens 230 which may be similar, respectively, to LIDAR 106, camera 108, rotating platform 110, and stationary platform 114, optical element(s) 124, and optical element(s) 130. To that end, device 200 illustrates an example implementation of system 100 where LIDAR 206 and camera 208 each have separate respective optical lenses 224 and 230.

As shown, light beams 280 emitted by LIDAR 206 propagate from lens 224 along a pointing direction of LIDAR 206 toward an environment of LIDAR 206, and reflect off one or more objects in the environment as reflected light 290. As such, LIDAR 206 can then receive reflected light 290 (e.g., through lens 224) and provide data indicating the distance between the one or more objects and the LIDAR 206.

Further, as shown, camera 208 receives and detects external light 292. External light 292 may include light originating from one or more external light sources, background light sources (e.g., the sun, etc.), among other possibilities. To that end, external light 292 may include light propagating directly from an external light source toward lens 230 and/or light originating from an external light source and reflecting off one or more objects in the environment of device 200 before propagating toward lens 230. As such, for example, camera 208 may generate an image of the environment based on external light 292. The image may include various types of information such as light intensities for different wavelengths (e.g., colors, etc.) in the external light 290, among other examples.

Further, as shown, camera 208 is coupled to LIDAR 206 (e.g., mounted on top of LIDAR 206) in a particular relative arrangement (e.g., similar pointing directions toward a left side of the page). As such, in some examples, the fields-of-view (FOVs) of LIDAR 206 and camera 208 may at least partially overlap due to their similar respective pointing directions, even if there is an offset (e.g., vertical offset, etc.) between the exact respective positions of sensors 206 and 208. It is noted that other arrangements are also possible (e.g., camera 208 can be alternatively mounted to a bottom side or different side of LIDAR 206, LIDAR 206 and camera 208 may have different pointing directions, etc.).

Further, as shown, rotating platform 210 mounts LIDAR 206, and thus supports LIDAR 206 and camera 208 in the particular relative arrangement shown. By way of example, if rotating platform 210 rotates, the pointing directions of LIDAR 206 and camera 208 may simultaneously change according to the particular relative arrangement shown. In turn, an extent of overlap between the respective FOVs of LIDAR 106 and camera 208 may remain unchanged in response to such rotation by platform 210.

In some examples, LIDAR 206 (and/or camera 208) can be configured to have a substantially cylindrical shape and to rotate about an axis of device 200. Further, in some examples, the axis of rotation of device 200 may be substantially vertical. Thus, for instance, by rotating LIDAR 206 (and the attached camera 208), device 200 (and/or a computing system that operates device 200) can determine a three-dimensional map (including color information based on images from camera 208 and distance information based on data from LIDAR 206) of a 360-degree view of the environment of device 200. Additionally or alternatively, in some examples, device 200 can be configured to tilt the axis of rotation of rotating platform 210 (relative to stationary platform 214), thereby simultaneously adjusting the FOVs of LIDAR 206 and camera 208. For instance, rotating platform 210 may include a tilting platform that tilts in one or more directions to change an axis of rotation of device 200.

In some examples, lens 224 can have an optical power to both collimate (and/or direct) emitted light beams 280 toward an environment of LIDAR 206, and focus light 290 received from the environment onto a LIDAR receiver (not shown) of LIDAR 206. In one example, lens 224 has a focal length of approximately 120 mm. Other example focal lengths are possible. By using the same lens 224 to perform both of these functions, instead of a transmit lens for collimating and a receive lens for focusing, advantages with respect to size, cost, and/or complexity can be provided. Alternatively however, LIDAR 206 may include separate transmit and receive lenses. Thus, although not shown, LIDAR 206 can alternatively include a transmit lens that directs emitted light 280 toward the environment, and a separate receive lens that focuses reflected light 290 for detection by LIDAR 206.

Figure 3A:
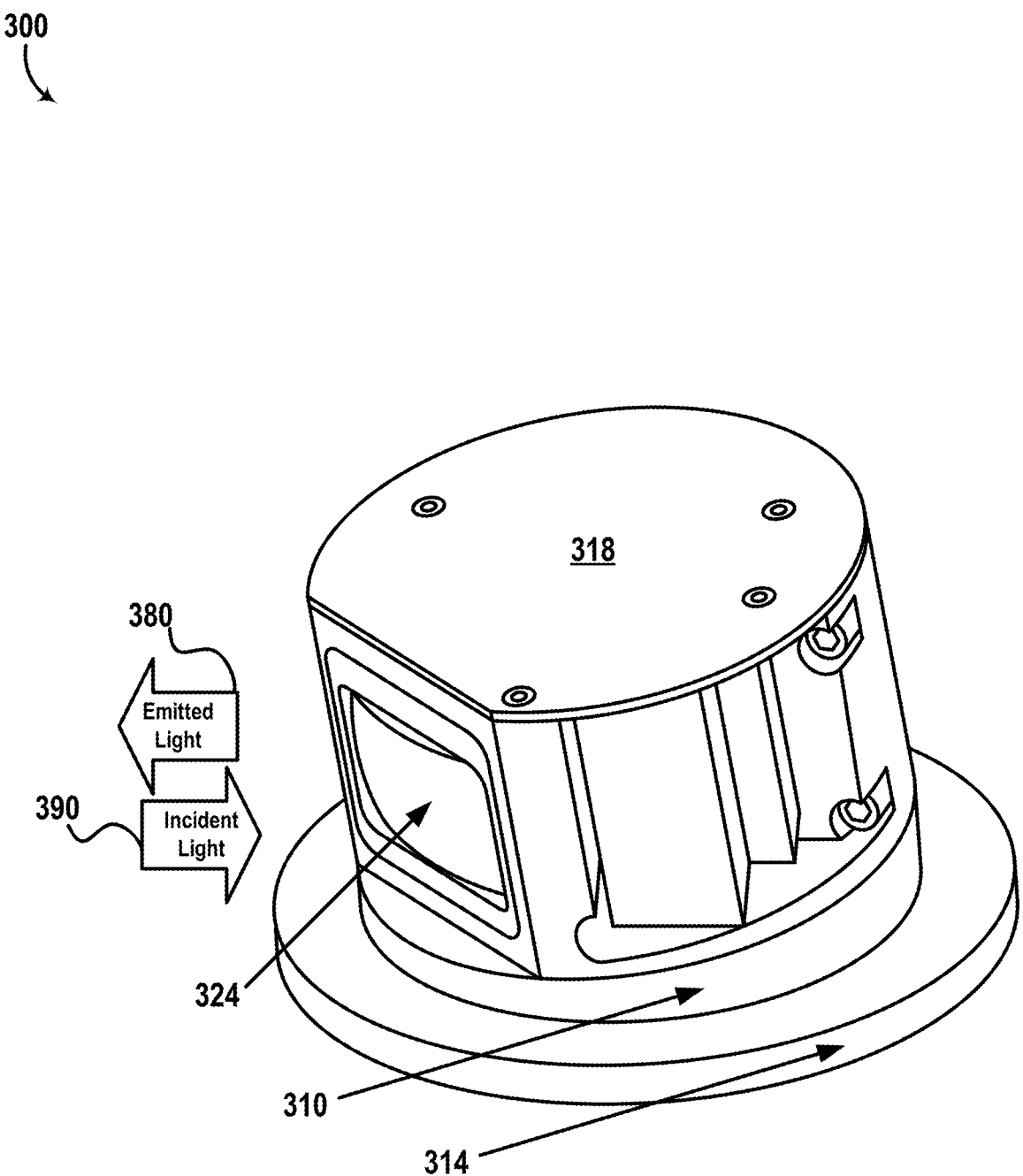
FIG. 3A illustrates another device that includes co-aligned rotating sensors, according to example embodiments.

FIG. 3A shows another device 300 that includes co-aligned rotating sensors, according to example embodiments. As shown, device 300 includes a rotating platform 310, a stationary platform 314, a housing 318, and a lens 324 that are similar, respectively, to rotating platform 110, stationary platform 114, housing 118, and optical element(s) 124 (and/or 130). Thus, device 300 may be similar to system 100 and/or device 200. Incident light 390 may include reflections of emitted light 380 (emitted by device 300), as well as external light (e.g., similar to light 292) originating from external light sources. Thus, unlike device 200, device 300 is shown to include a single lens 324 for receiving incident light 390 instead of a LIDAR lens (e.g., lens 224) and a physically separate camera lens (e.g., lens 230).

Figure 3B:
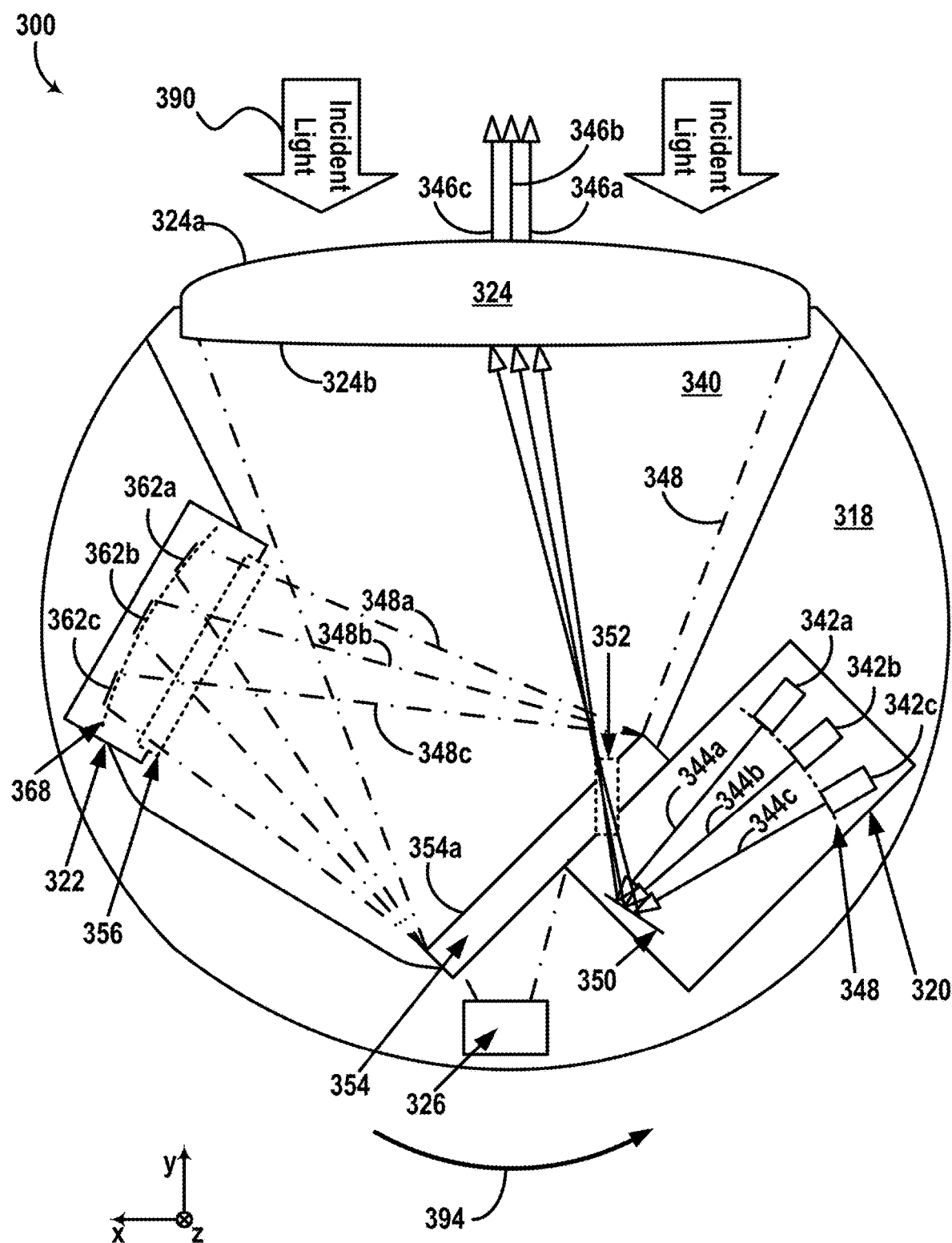
FIG. 3B is a cross-section view of the device of FIG. 3A.

FIG. 3B illustrates a cross-section view of device 300. As shown, housing 318 includes a transmitter 320, a receiver 322, lens 324, and an optical element 354, which may be similar to, respectively, transmitter 120, receiver 122, and optical element(s) 124 (and/or 130). Further, as shown, device 300 includes a shared space 340. For purposes of illustration, FIG. 3B shows an x-y-z axis, in which the z-axis is pointing out of the page.

Transmitter 320 includes a plurality of light sources 342a-c arranged along a curved focal surface 348. Light sources 342a-c can be configured to emit, respectively, a plurality of light beams 344a-c having wavelengths within a wavelength range. For example, light sources 342a-c may comprise laser diodes that emit light beams 344a-c having the wavelengths within the wavelength range. As shown, light beams 344a-c are reflected by mirror 350 through an exit aperture 352 into shared space 340 and toward lens 324.

To that end, light sources 342a-c may include laser diodes, light emitting diodes (LEDs), laser bars (e.g., diode bars), vertical cavity surface emitting lasers (VCSELs), organic light emitting diodes (OLEDs), polymer light emitting diodes (PLEDs), light emitting polymers (LEPs), liquid crystal displays (LCDs), microelectromechanical systems (MEMS), or any other device configured to selectively transmit, reflect, and/or emit light beams 344a-c. In some examples, light sources 342a-c can be configured to emit light beams 344a-c in a wavelength range that can be detected by receiver 322. The wavelength range could, for example, be in the ultraviolet, visible, and/or infrared portions of the electromagnetic spectrum. In some examples, the wavelength range can be a narrow wavelength range, such as provided by lasers. In one embodiment, the wavelength range includes a source wavelength of 905 nm. Additionally, light sources 342a-c can optionally be configured to emit light beams 344a-c in the form of pulses. In some examples, light sources 342a-c can be disposed on one or more substrates (e.g., printed circuit boards (PCB), flexible PCBs, etc.) and arranged to emit light beams 344a-c toward mirror 350. To that end, mirror 350 may include any reflective material suitable for reflecting the wavelengths of light beams 344a-c through exit aperture 352 and toward lens 324.

Although FIG. 3B shows that curved focal surface 348 is curved in a horizontal plane (e.g., x-y plane), additionally or alternatively, light sources 344a-c may be arranged along a focal surface that is curved in a vertical plane (e.g., perpendicular to the x-y plane, etc.). In one example, curved focal surface 348 can have a curvature in a vertical plane, and light sources 344a-c can include additional light sources arranged vertically along focal surface 348 and configured to emit light beams directed toward mirror 350 and then reflected (by mirror 350) through exit aperture 352 and toward lens 324. In this example, detectors 362a-c may also include additional detectors that correspond to the additional light sources. Further, in some examples, light sources 342a-c may include additional light sources arranged horizontally along curved focal surface 348. In one embodiment, light sources 342a-c may include sixty-four light sources that emit light having a wavelength of 905 nm. For instance, the sixty-four light sources may be arranged in four columns, each comprising sixteen light sources. In this instance, detectors 362a-c may include sixty-four detectors that are arranged similarly (e.g., four columns comprising sixteen detectors each, etc.) along curved focal surface 368. However, in other embodiments, light sources 342a-c and detectors 362a-c may include additional or fewer light sources and/or detectors than those shown.

Due to the arrangement of light sources 342a-c along curved focal surface 348, light beams 344a-c, in some examples, may converge toward exit aperture 352. Thus, in these examples, exit aperture 352 could be minimally sized while being capable of accommodating the vertical and horizontal extents of light beams 344a-c. Additionally, in some examples, a curvature of curved focal surface 348 can be based on optical characteristics of lens 324. For example, curved focal surface 348 may be shaped according to a focal surface of lens 324 (e.g., based on shape and/or composition of lens 324) at transmitter 320.

As shown, light beams 344a-c propagate in a transmit path that extends through transmitter 320, exit aperture 352, and shared space 340 toward lens 324. Further, as shown, lens 324 may be configured to collimate light beams 344a-c into, respectively, light beams 346a-c for propagation toward an environment of device 300. In some examples, collimated light beams 346a-c may then reflect off one or more objects in the environment, and the reflections may then propagate back toward device 300 within incident light 390.

Further, as noted above, incident light 390 may also include external light originating from one or more external light sources (e.g., solar, background light, street lamp, vehicle lamp, etc.), and at least a portion of the external light may also reflect off the one or more objects prior to propagating toward device 300. Incident light 390 may then be focused by lens 324 into shared space 340 as focused light 348 traveling along a receive path that extends through shared space 340 toward optical element 354. For example, at least a portion of focused light 348 may be reflected on selectively (or partially) reflective surface 354a as focused light 348a-c toward receiver 322.

Thus, in some examples, lens 324 may be capable of both collimating emitted light beams 344a-c and focusing incident light 390 based on optical characteristics (e.g., due to shape, composition, etc.) of lens 324. In one particular embodiment, lens 324 can have an aspheric surface 324a outside of housing 318 (facing the environment of device 300) and a toroidal surface 324b inside of housing 318 (facing shared space 340). By using the same lens 324 to perform both of these functions, instead of a transmit lens for collimating and a receive lens for focusing, advantages with respect to size, cost, and/or complexity can be provided. However, in other embodiments, device 300 may alternatively include a transmit lens for collimating emitted light beams 344a-c, and a separate receive lens for focusing incident light 390. For instance, although not shown, device 300 may alternatively include a separate housing (other than housing 318) that houses transmitter 320 such that light beams 344a-c are emitted in a different space than shared space 340. However, for the sake of example, device 300 is configured as shown (i.e., with a shared transmit/receive lens 324).

As shown, optical element 354 is located between transmitter 320 and shared space 340 along a path of focused light 348. Optical element 354 may comprise any device having optical characteristics suitable for selectively or partially reflecting a first portion of focused light 348 (incident on surface 354a) toward receiver 322, and transmitting a second portion of focused light 348 through optical element 354 and toward image sensor 326.

In one example, optical element 354 (or a portion thereof) may comprise a material having partially reflective optical properties. For instance, optical element 354 may comprise a half mirror or beam splitter that reflects a first portion of focused light 348 toward receiver 322, and transmits a second portion of focused light 348 through optical element 354 and toward image sensor 354.

In another example, optical element 354 (or a portion thereof) may comprise a material having wavelength-based transmission and reflection properties. For instance, optical element 354 may comprise a dichroic mirror, which may be formed from a dielectric material, crystalline material, or any other material having wavelength-based reflection and/or transmission properties. Thus, for instance, the dichroic mirror may be configured to reflect wavelengths of light within the wavelength range of light beams 344a-c (originated by transmitter 320 and reflected off one or more objects in the environment of device 300) toward receiver 322. Further, the dichroic mirror may be configured to transmit a portion of focused light 348 having wavelengths outside the wavelength range of light beams 344a-c toward image sensor 326.

Thus, in some implementations, optical element 354 can be employed (e.g., as a light filter, etc.) to reduce an amount of external light (e.g., light originating from light sources other than light sources 342a-c) propagating toward receiver 322, by transmitting such external light through optical element 354 toward image sensor 326. In other implementations, optical element 354 can be employed as a beam splitter (e.g., half mirror, etc.) that reflects a portion of focused light 348 toward receiver 322 (without necessarily separating particular wavelengths from the reflected portion). Regardless of the implementation, optical element 354 may be configured to allow both receiver 322 and image sensor 326 to detect respective portions of incident light 390 (focused as focused light 348). As a result, for instance, both receiver 322 and image sensor 326 may have co-aligned FOVs.

As shown, exit aperture 352 is included in optical element 354. In some examples, optical element 354 can be formed from a transparent material (e.g., glass, etc.) that is coated with selectively or partially reflective material 354a (e.g., dielectric material, crystalline material, other material having wavelength-based reflection and/or transmission properties, partially reflective material, etc.). In a first example, exit aperture 352 may correspond to a portion of optical element 354 that is not coated by the selectively or partially reflective material 354a. In a second example, exit aperture 352 may comprise a hole or cut-away in dichroic mirror 354.

However, in other examples, exit aperture 352 can be formed in a different manner. In one example, optical element 354 (e.g., beam splitter, dichroic mirror, etc.) can be formed to have optical characteristics that allow light wavelengths associated with light beams 344a-c to propagate from one side of optical element 354 (e.g., side facing transmitter 320) toward and out of an opposite side (e.g., side facing shared space 340), while preventing (or reflecting or reducing) an amount of such light from propagating in an opposite direction (e.g., from surface 354a toward opposite surface of element 354, etc.). In another example, optical element 354 may be configured to allow transmission of light wavelengths associate with light beams 344a-344c and incident on optical element 354 at a particular angle, while reflecting such light wavelengths incident on optical element 354 at different angles. In this example, mirror 350 can be configured to direct light beams toward optical element 354 according to the particular angle that allows transmission of light beams 344a-c toward lens 324, and lens 324 can have optical characteristics such that focused light 348 propagates toward optical element 354a at a different angle than the particular angle.

Image sensor 326 may be similar to image sensor 126. For example, image sensor 326 may include an array of sensing elements (e.g., CCDs, etc.) that are arranged to detect a first portion of the focused light transmitted through optical element 354. Further, image sensor 326 may output an image including image pixel data (e.g., color information, etc.) indicative of an amount of light incident on the array of sensing elements during a given exposure time. Thus, the output image may correspond to an image of the scene that is simultaneously scanned by device 300 (using emitted light beams 344a-344c) based on detection of external light (included in incident light 390 along with reflections of light beams 344a-344c). To that end, the external light detected by image sensor 326 may indicate additional information (e.g., RGB color information, etc.) due to the larger extent of wavelengths in the external light within incident light 390 that may be detectable by sensing elements of image sensor 326.

Further, in line with the discussion above, a second portion of focused light 348 (incident on optical element 354) may be reflected at optical element 354 toward an entrance aperture 356 of receiver 322. In some examples, entrance aperture 356 may comprise a filtering window or light filter configured to transmit wavelengths in the wavelength range of light beams 344a-c (e.g., source wavelength) originating from light sources 342a-c, while attenuating other wavelengths (e.g., external light). Thus, as shown, at least a portion of focused light, shown as light 348a-c, propagates toward detectors 362a-c.

Detectors 362a-c may comprise photodiodes, avalanche photodiodes, phototransistors, charge coupled devices (CCD), CMOS sensors, thermopile arrays, cryogenic detectors, or any other sensor of light configured to detect focused light 348a-c having wavelengths in the wavelength range of the emitted light beams 344a-c (e.g., the source wavelength).

As shown, detectors 362a-c can be arranged along curved focal surface 368 of receiver 322. Although curved focal surface 368 is shown to be curved along the x-y plane (horizontal plane), additionally or alternatively, curved focal surface 368 can be curved in a vertical plane. Thus, similarly to focal surface 348, a curvature of focal surface 368 may also be defined by optical characteristics of lens 324. For example, curved focal surface 368 may correspond to a focal surface of light projected by lens 324 at receiver 322.

Thus, for example, detector 362a may be configured and arranged to receive focused light portion 348a that corresponds to a reflection of collimated light beam 346a off one or more objects in the environment of device 300. Further, as noted above, collimated light beam 346a corresponds to light beam 344a emitted by the light source 342a. Thus, detector 362a may be configured to receive light that was originally emitted by light source 342a based on the arrangement and optical characteristics of the various components of device 300. Similarly, detector 362b may be arranged to receive light that was originally emitted by light source 342b, and detector 362c may be arranged to receive light that was emitted by light source 342c.

With this arrangement, device 300 (and/or a computing device that operates device 300) may determine at least one aspect of one or more objects (e.g., off which at least a portion of focused light 348a-348c was reflected) by comparing detected characteristics of received light 348a-c (measured using detectors 362a-c) with characteristics of emitted light beams 344a-c (transmitted using light sources 344a-c). For example, by comparing emission times when light beams 344a-c were emitted by light sources 342a-c and detection times when detectors 362a-c received focused light 348a-c, a distance between device 300 and the one or more objects could be determined. As another example, respective modulation characteristics (e.g., power level, waveform shape, etc.) of emitted light 344a-c and detected light 348a-c can be compared to determine information about the one or more objects (e.g., distance, speed, material properties, etc.). Thus, in some examples, various characteristics of the one or more objects such as distance, speed, shape, material, texture, among other characteristics, could optionally be determined using data from receiver 322.

Further, due to the co-aligned relative arrangement of receiver 322 and image sensor 326, image pixel data (e.g., color information, etc.) collected using image sensor 326 can be more suitable for efficiently mapping with LIDAR data collected using receiver 322. For example, a computing device (e.g., controller 104, etc.) can operate image sensor 326 to capture image pixel data according to emission times of light beams 344a-c emitted by transmitter 320, and/or detection times of light beams 348a-c detected by receiver 322. Further, for example, the shared (co-aligned) receive path of focused light 348 (with portions thereof respectively detected by receiver 322 and image sensor 326) can further improve mapping image pixel data from image sensor 326 to LIDAR data from receiver 322 due to the overlapping FOVs of both sensors 322 and 326.

In some examples, device 300 may be rotated about an axis to determine a three-dimensional map of the surroundings of device 300. For example, device 300 may be rotated about a substantially vertical axis (extending out of the page) as illustrated by arrow 394. Further, although device 300 is shown to be rotated in a counterclockwise direction (e.g., arrow 394), device 300 could alternatively be rotated in a clockwise direction. Further, in some examples, device 300 may be rotated for 360 degree (e.g., complete) rotations. In other examples however, device 300 may be rotated back and forth along a portion of a 360 degree range of pointing directions of device 300. For example, device 300 could be mounted on a platform that wobbles back and forth about an axis without making a complete rotation.

To that end, as shown, the arrangement of light sources 342a-c and detectors 362a-c may define a particular vertical LIDAR FOV of device 300. In one embodiment, the vertical LIDAR FOV is 20°. Further, in one embodiment, complete rotations (360 degrees) of device 300 may define a 360° horizontal LIDAR FOV of device 300. In this regard, a rate of the rotation of device 303 may define a LIDAR refresh rate of device 300. In one embodiment, the refresh rate is 10 Hz. Further, the LIDAR refresh rate together with the arrangement of light sources 342a-c and detectors 352a-c may define a LIDAR angular resolution of device 300. In one example, the LIDAR angular resolution is 0.2°×0.3°. However, it is noted that the various parameters described above, including the refresh rate, the angular resolution, etc., may vary according to various configurations of device 300.

Further, in some examples, regardless of the specific parameters selected for the LIDAR scanning operations of device 300, the particular relative arrangement of the various components shown in device 300 can facilitate operating the image sensor 326 in a coordinated manner with receiver 322. In a first example, if a light pulse rate of emitted light beams 344a-c is adjusted, an image capture rate by image sensor 326 can be similarly adjusted to facilitate time-domain based mapping of image pixel data collected using image sensor 326 to LIDAR data collected using receiver 322. In a second example, device 300 may continue to provide a suitable amount of overlapping data points (e.g., image pixels that correspond to LIDAR data points, etc.) between collected LIDAR data and collected image data even as device 300 continues to rotate. For instance, the particular relative arrangement of transmitter 320, receiver 322, and image sensor 326 shown may remain substantially unchanged in response to rotation of device 300. Thus, with this arrangement, the pointing directions of image sensor 326 and receiver 322 may simultaneously and similarly change for any direction of rotation (e.g., clockwise or counterclockwise) and/or rate of rotation of device 300. As a result, for instance, the LIDAR data (from receiver 322) and the image data (from image sensor 326) may include a suitable amount of overlapping data points (e.g., both in terms of time of data collection and FOVs associated with the collected data), even if rotation characteristics of device 300 vary. Other examples are possible as well.

It is noted that device 300 may include additional, fewer, or different components than those shown. Further, it is noted that the sizes and shapes of the various components 300 are illustrated as shown only for convenience in description and are not necessarily to scale. Further, in some examples, one or more of the components shown can be combined, arranged, or separated in a variety of different configurations without departing from the scope of the present disclosure.

In a first example, light sources 342a-c and/or detectors 362a-c may be configured differently (e.g., along different curved focal surfaces, along linear or flat focal surfaces, with different numbers of light sources/detectors, etc.).

In a second example, transmitter 320 can be physically implemented as a separate component outside housing 318. Thus, housing 318 could alternatively include receiver 322 and image sensor 326, but not transmitter 320.

In a third example, image sensor 326 can be alternatively positioned in a different location within housing 318. For instance, image sensor 318 can be arranged adjacent to receiver 322. In this instance, a relatively small portion of focused light 348 may correspond to a detection area of detectors 362a-c, and a remaining portion of focused light 348 can be intercepted by image sensor 326 at any location within shared space 340 (with or without optical element 354).

In a fourth example, an orientation of image sensor 326 can be different than the orientation shown. For instance, image sensor 326 (and/or sensing elements thereof) could be aligned according to a focal surface defined by lens 324 (e.g., perpendicular to a a focal plane of lens 324, along a curved focal surface, defined by lens 324 etc.). Alternatively or additionally, for instance, image sensor 326 may include one or more columns of sensing elements (e.g., similar to sensing elements 128) that are aligned (e.g., parallel, etc.) with an axis of rotation of device 300.

In a fifth example, the locations of receiver 322 and image sensor 326 can be interchanged. For instance, optical mirror 354 can be alternatively configured to reflect wavelengths of light outside the wavelength range of emitted light beams 344a-c, and to transmit light in the wavelength range through optical element 354. Thus, in this instance, receiver 322 can be alternatively positioned behind optical element 354 (e.g., in the location shown for image sensor 326), and image sensor 326 can be alternatively positioned in the location shown for receiver 322. Other examples are possible as well.

Figure 4:
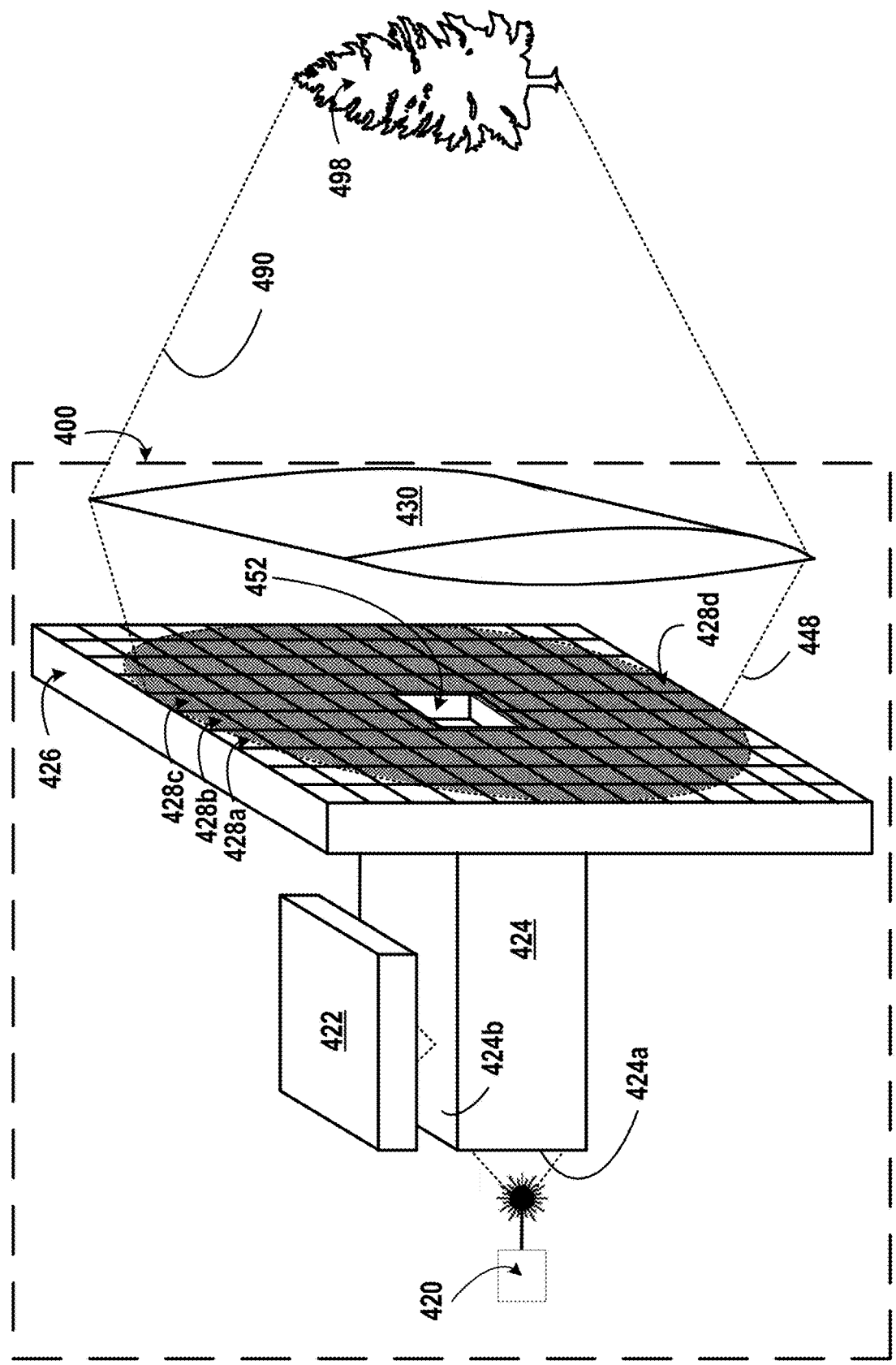
FIG. 4 illustrates a partial view of yet another device that includes co-aligned rotating sensors, according to example embodiments.

FIG. 4 illustrates a partial view of yet another device 400 that includes co-aligned rotating sensors, according to example embodiments. As shown, device 400 includes a transmitter 420, a receiver 422, an image sensor 426, and a lens 430, which may be similar, respectively, to transmitter 120, receiver 122, image sensor 126, and optical element(s) 124 (or 126), for example. Further, as shown, device 400 also includes a waveguide 424 (e.g., optical waveguide, etc.) and an aperture 452.

In some implementations, one or more of the components of device 400 shown can be used with device 300 instead of or in addition to the various components included in housing 318 (and shown in FIG. 3B). Thus, similarly to device 300, device 400 can be configured to rotate about an axis while maintaining the particular relative arrangement of transmitter 420, receiver 422, and image sensor 426 shown in FIG. 4.

Further, as shown, device 400 may measure incident light 490 scattered by an object 498 within a scene in an environment of device 400. To that end, incident light 490 may be similar to incident light 390 and may include reflections of light originating from transmitter 420 as well as external light originating from one or more external light sources (and reflecting off object 498). Thus, in some examples, lens 430 may be configured as a shared lens that focuses light for detection by receiver 422 and image sensor 426 according to a shared co-aligned receive path.

Transmitter 420 may include one or more light sources, similarly to any of light sources 342a-c. As shown, transmitter 420 emits light (e.g., similar to any of light beams 344a-c) toward a first side 424a of waveguide 424.

Waveguide 424 may include any optical waveguide that guides propagation of light (e.g., via internal reflection at walls of waveguide 424, etc.). As shown, for instance, waveguide 424 may guide emitted light from transmitter 420 (entering waveguide 424 at side 424a) toward another side of waveguide 424 (opposite to side 424a). To that end, for example, waveguide 424 can be formed from a glass substrate (e.g., glass plate, etc.) or any other material at least partially transparent to one or more wavelengths of the light emitted by transmitter 420. In some examples, as shown, waveguide 424 may be proximally positioned and/or in contact with image sensor 426 such that the guided light from transmitter 420 is transmitted through aperture 452 toward lens 430.

As shown, image sensor 426 includes an array of sensing elements, exemplified by sensing elements 428a-d. Sensing elements 428a-d may be similar to sensing elements 128, and may include any type of device (e.g., CCD, etc.) that detects a portion of focused light 448 (focused by lens 430 toward image sensor 426). Thus, in one example, data from the sensing elements of image sensor 426 can be used to generate respective image pixels of an image (captured by image sensor 426) of the scene that includes object 498.

Further, as shown, aperture 452 may correspond to a region of image sensor 426 that allows transmission of light between waveguide 424 and lens 430. For example, aperture 452 may correspond to a region of image sensor 426 that does not include sensing elements (e.g., cavity, etc.). As another example, aperture 452 may correspond to a region that is transparent to wavelengths of light similar to wavelengths of the emitted light originating from transmitter 420. Other examples are possible as well.

Thus, in an example scenario, lens 430 may be configured to direct the emitted light (originating from transmitter 420, entering waveguide 424 at side 424a, and transmitted through aperture 452 toward lens 430) toward object 498. In the scenario, at least a portion of the emitted light may then reflect off object 498 back toward lens 430 as incident light 490. As noted above, incident light 490 may also include external light originating from external light source(s) and reflecting off object 498 together with the light originating from transmitter 420. Continuing with the scenario, lens 430 may then focus incident light 490, as focused light 448, toward image sensor 426 and aperture 452. Waveguide 424 may then guide at least a portion of focused light 448 (i.e., the portion transmitted through aperture 452 into waveguide 424), via internal reflection at walls of waveguide 424 for instance, inside waveguide 424. For instance, where waveguide 424 is a rectangular waveguide as shown, waveguide 424 can guide at least a portion of focused light 448 toward side 424b.

Further, in the scenario, at least a portion of the guided light incident on side 424b may propagate out of waveguide 424 toward receiver 422. For example, waveguide 424 can be configured as a leaky waveguide that allows photons to escape through side 424b for detection by receiver 422. As another example, although not shown, device 400 may include a mirror (e.g., reflective material, half mirror, dichroic mirror, etc.) disposed within or otherwise coupled to waveguide 424 to reflect at least a portion of the guided light out of waveguide 424 through side 424b. Other examples are possible.

Thus, with this arrangement, receiver 422 may detect reflections of the light emitted by transmitter 420 (and reflected off object 498), and image sensor 426 can simultaneously or in another coordinated fashion detect external light from the scene (reflecting off object 498) and focused onto sensing elements (e.g., 428a-d) of image sensor 426. For example, lens 430 may be configured to have an optical power for focusing a first portion of incident light 490 onto a location of aperture 452, where the first portion corresponds to the emitted light originating at transmitter 420. Further, for example, lens 430 may be configured to have the optical power to focus a second portion of incident light 490 (e.g., originating from external light source(s), etc.) toward a (e.g., larger) detection area where the sensing elements of image sensor 426 are located. For instance, aperture 452 can be located at a focal distance of lens 430. In this instance, a light beam (transmitted through aperture 452 toward lens 430) could diverge toward object 498 based on optical characteristics of lens 430 and reflect back to lens 430. Further, due to the aperture being at the focal distance of lens 430, the reflections of the light beam may be focused back into aperture 452, whereas the external light focused by lens 430 may be focused onto other regions of the focal plane of lens 430 (e.g., regions where sensing elements of image sensor 426 are located). Other examples are possible.

It is noted that the sizes, positions, and shapes of the various components and features shown in FIG. 4 are not necessarily to scale, but are illustrated as shown for convenience in description. Further, in some embodiments, one or more of the components shown can be combined, or divided into separate components. Further, in some examples, system 300 may include fewer or more components than those shown.

In a first example, device 400 can alternatively include multiple apertures that define optical paths through image sensor 426. Further, each aperture may be coupled to a waveguide, transmitter, and/or receiver, similarly to aperture 452. By doing so for instance, multiple LIDAR data points can be captured simultaneously with the capture of an image using image sensor 426. In a second example, the distance between image sensor 426 (and aperture 452) relative to lens 430 can vary. In a third example, the sensing elements in image sensor 426 can be alternatively implemented as separate physical structures. In a fourth example, although the array of sensing elements in image sensor 426 is arranged along a linear (flat) surface, the sensing elements can alternatively be arranged along a different surface. For instance, a given column of sensing elements (e.g., extending from elements 428c to 428d) can be arranged at a different distance to lens 430 than another column of sensing elements in the image sensor 426. In a fifth example, receiver 422 can be implemented to alternatively or additionally overlap one or more other sides of waveguide 424). In a sixth example, image sensor 426 may include a different number of sensing elements than shown. Other examples are possible.

Additionally, it is noted that the sensor configurations of devices 200, 300, 400 are only for the sake of example. Thus, other example sensor configurations are possible as well without departing from the scope of the present disclosure.

In a first example, various LIDAR device arrangements different than those shown can be combined with an image sensor on a rotating platform in a variety of different ways such that the image sensor and a receiver of the LIDAR remain in a particular relative arrangement in response to rotation of the platform. For instance, a LIDAR device can be configured to have a LIDAR transmitter implemented separately from a LIDAR receiver. In this instance, the LIDAR receiver can be coupled to the image sensor to achieve a co-aligned receive path (e.g., particular relative arrangement, co-aligned pointing directions, and/or simultaneously changing respective pointing directions) for the LIDAR receiver and the image sensor. To that end, the particular relative arrangement of the LIDAR receiver and the image sensor on the rotating platform can vary depending on the particular configuration and optical characteristics of a corresponding LIDAR system within an example device.

In a second example, different types of sensors can be employed in addition to or instead of a LIDAR and an image sensor. In one implementation, referring back to FIG. 2, LIDAR 206 can be replaced with RADAR, SONAR, or any other type of active sensor, and camera 208 can be replaced by a microphone, a pressure sensor, an antenna, or any other type of passive sensor. In another implementation, continuing with the example of FIG. 2, LIDAR 206 and camera 208 can both be replaced with active sensors (e.g., RADAR and SONAR, etc.), or can both be replaced with passive sensors (e.g., microphone and pressure sensor, etc.). Other combinations of sensors are possible as well.

III. EXAMPLE SCANNING METHODS AND COMPUTER READABLE MEDIA

As noted above, in some scenarios, capturing data using a rotating sensor can result in image smearing (e.g., a light detector that intercepts light over a long period of time while the sensor is rotating may detect light from several FOVs and/or regions of the scene). However, for instance, detectors (e.g., array of single photon avalanche diodes or SPADs) of a LIDAR receiver may be able to detect a returning light pulse within a relatively short time window. Thus, a rotating LIDAR may mitigate the effects of the rotation by transmitting short pulses and listening for returning light pulses over a short time window (e.g., nanoseconds, microseconds, etc.) relative to the rate of rotation of the LIDAR.

On the other hand, a CCD element of an image sensor, for example, may be more suitable for operation according to a relatively longer exposure time that allows collecting a sufficient amount of light that indicates color information indicated by incident light (e.g., intensity of red, green, or blue light). However, in some instances, exposing the CCD element for such exposure time may cause the CCD element to receive light originating from multiple points in the scene rather than a single point. Further, for instance, a shorter exposure time may be insufficient to detect a sufficient amount of the incident light (e.g., especially in low light conditions) to provide such light intensity information.

Thus, an example system may address these issues by adding a first pixel (captured at a first time while the sensor is rotating) to a second pixel (captured at a second time while the sensor is rotating). Further, the example system may select which image pixels to add based on a variety of factors, such as a rate of rotation of the rotating device, a distance between an imaged object and the rotating device (e.g., indicated by LIDAR data), and/or optical characteristics of the rotating device (e.g., lens characteristics, position of image sensor relative to focal length of lens, etc.).

Figure 5:
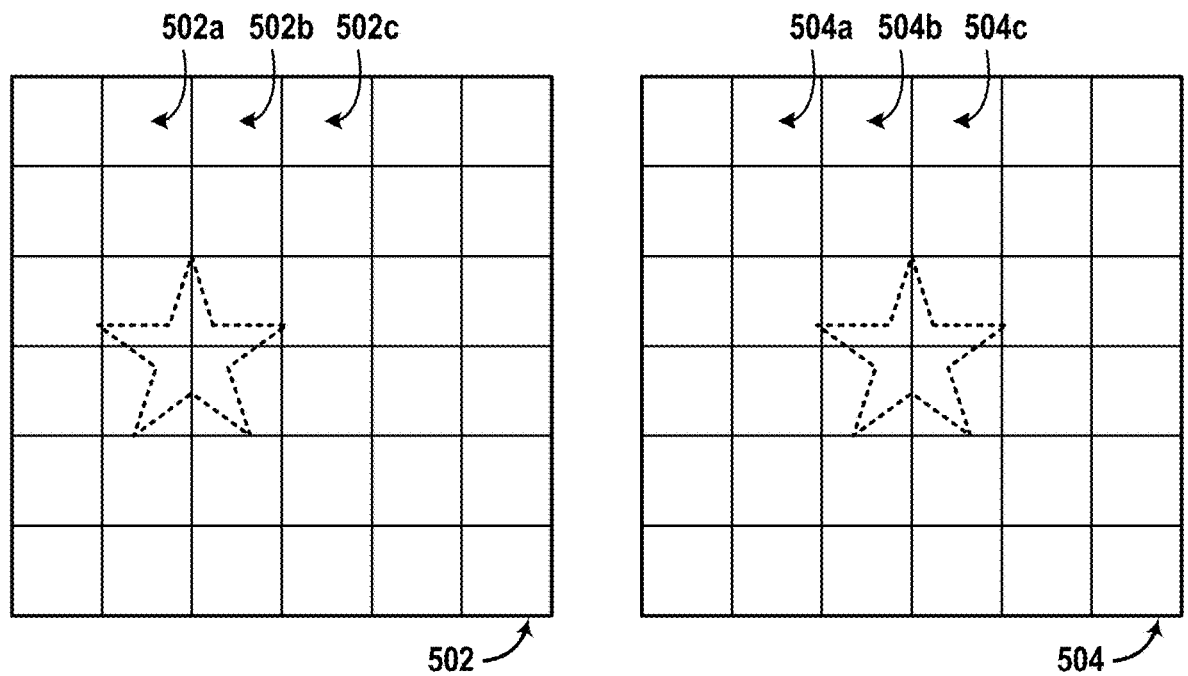
FIG. 5 is a first conceptual illustration of images based on data from one or more rotating sensors, according to example embodiments.

FIG. 5 is a first conceptual illustration of images 502, 504 based on data from one or more rotating sensors, according to example embodiments. In the scenario shown, image 502 may be based on image sensor data obtained using any of image sensors 126, 326, 426, or cameras 108, 208, at a first time. Similarly, image 504 may be based on image sensor obtained at a second time after the first time. For instance, images 502, 504 may be obtained at different times while any of system 100, devices 200, 300, and/or 400 are rotating their respective image sensors (or cameras).

To that end, for example, each grid cell in the grid representation of image 502 may correspond to a particular image pixel (or a group of image pixels) in an image indicated by an array of sensing elements (e.g., sensing elements 128 or 428) at a first time. For instance, grid cell/image pixel 502a may be determined based on image pixel data from a first sensing element (or group of sensing elements) in array 428, image pixel 502b may be determined based on data from a second sensing element (or group) adjacent to the first sensing element in a horizontal direction (e.g., same row), and image pixel 502c may be determined based on data from a third sensing element (or group) adjacent to the second sensing element in the horizontal direction. By way of example, image pixels 502a, 502b, 502c, may be determined using data from, respectively, sensing elements 428a, 428b, 428c.

It is noted that the numbers and sizes of image pixels 502a-c in image 502 are not necessarily to scale but are only for convenience in description. In practice, for instance, image 502 may include hundreds or thousands or any other number of image pixels.

Continuing with the scenario of FIG. 5, image pixels 504a, 504b, 504c of image 504 may be based on data from the same respective sensing elements used to generate image pixels 502a, 502b, 502c of image 502 but at the second time after the first time when the data of image 502 was captured.

Further, in the scenario shown, images 502, 504 may indicate a star-shaped object in the scene scanned by the rotating sensor. As shown in image 502 for instance, the imaged object is indicated within a first image pixel column that includes pixel 502a and a second image pixel column that includes pixel 502b. As shown image 504, the imaged object appears to have moved to the right side of the image (e.g., due to rotation of the image sensor) such that it is indicated within the two image pixel columns that include pixels 504b and 504c.

Thus, in some implementations, an example system may combine (e.g., add, sum, etc.) data of the first image pixel column (i.e., which includes pixel 502a) of image 502 to data of a corresponding image pixel column (i.e., which includes pixel 504b) of image 504. Alternatively or additionally, the example system can combine other corresponding image pixel columns from the two images to (e.g., column of pixel 502b with column of pixel 504c). Thus, the example system can generate a composite image that simulates a longer exposure time (e.g., sum of exposure times used in the two images), thereby achieving an improved image quality of the composite image relative to the quality associated with just one of images 502 or 504. Further, in line with the discussion above, the example system can optionally synchronize the capture time of one or both of images 502, 504 with emission or detection times of light pulses associated with a co-aligned LIDAR (e.g., LIDARs 106, 206, 306, 406, etc.). By doing so, for instance, the example system can improve sensor fusion processes for mapping LIDAR data with image sensor data (e.g., one or more image pixels associated with image 502 or 504 can be matched to data points in the LIDAR data that were collected at a similar or same time, etc.).

It is noted that the scenario described above for the image sensor operation is only for the sake of example. Other examples are possible. For example, the image sensor may alternatively capture just one column of image pixels (e.g., using a column of sensing elements, etc.) at the first time associated with image 502 rather than the entire image, and the image sensor may alternatively capture just one image pixel column at the second time associated with image 504 rather than the entire image. Other variations are possible as well.

Figure 6:
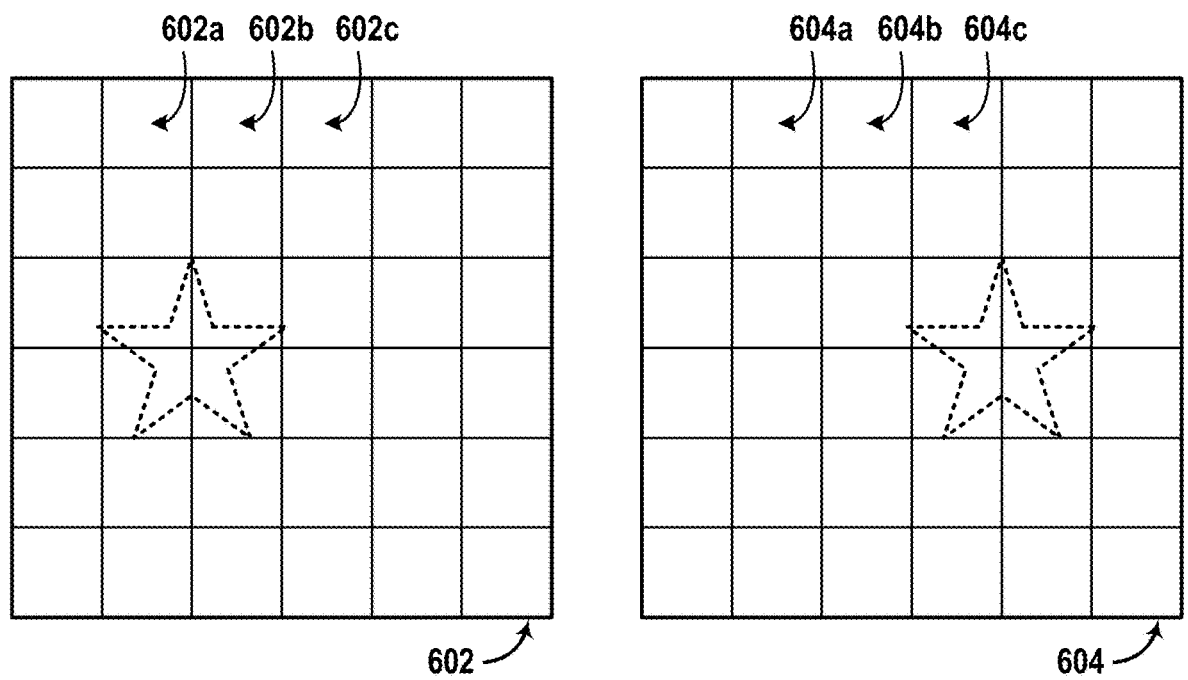
FIG. 6 is a second conceptual illustration of images based on data from one or more rotating sensors, according to example embodiments.

FIG. 6 is a second conceptual illustration of images 602, 604 based on data from one or more rotating sensors, according to example embodiments. In the scenario of FIG. 6, images 602, 604 may be determined, respectively, in a similar manner to the determination of images 502, 504 (e.g., at different times using data from a rotating image sensor, etc.). To that end, image pixels 602a, 602b, 602c, 604a, 604b, 604c, may be similar (e.g., based on data from the same respective sensing elements), respectively, to image pixels 502a, 502b, 502c, 504a, 504b, 504c.

As noted above, the choice of which image pixel to add from image 502 to a corresponding image pixel from image 504 may be based at least in part on rotation characteristics of a rotating platform supporting the image sensor that captured images 502, 504.

By way of example, the scenario shown in FIG. 6 illustrates a scenario where the image sensor is rotating at a higher rate of rotation than the rate of rotation of the image sensor in the scenario of FIG. 5. Thus, as shown in FIG. 6, the star-shaped imaged object appears to have moved further toward a right side of image 604 than the corresponding imaged object shown in image 504. As such, unlike the scenario in FIG. 5, an example system in this scenario may generate an image pixel column in a composite image of the scene based on a sum of a column of pixels in image 602 (including pixel 602a) and a corresponding column of pixels in image 604 (including pixel 604c) that is relatively closer to the right side of image 604.

In particular, although the scenarios of FIGS. 5 and 6 indicate that an imaged object appears to move in a single linear direction due to the rotation of the associated image sensor, in some scenarios, the rotation of the image sensor may alternatively cause various other distortions to the appearance of the imaged object. By way of example, the changing FOV of the image sensor (e.g., change of pointing direction and/or viewpoint of the image sensor, etc.) may alternatively cause the imaged object to appear rotated, re-sized, etc., in image 604 relative to an appearance of the imaged object in image 602. As another example, referring back to FIG. 2, a tilting direction of rotating platform 210 relative to stationary platform 214 may cause an imaged object captured by camera 208 in a plurality of images (as camera 208 rotates) may appear to be moving in a vertical direction. As yet another example, referring back to FIGS. 3A-3B, the optical characteristics of lens 324 (e.g., surface shapes of surfaces 324a, 324b, etc.) may cause the shape of the imaged object to become distorted as device 300 rotates according to arrow 394. Other examples are possible as well depending on the particular configuration of the device that includes the co-aligned rotating sensors.

Figure 7:
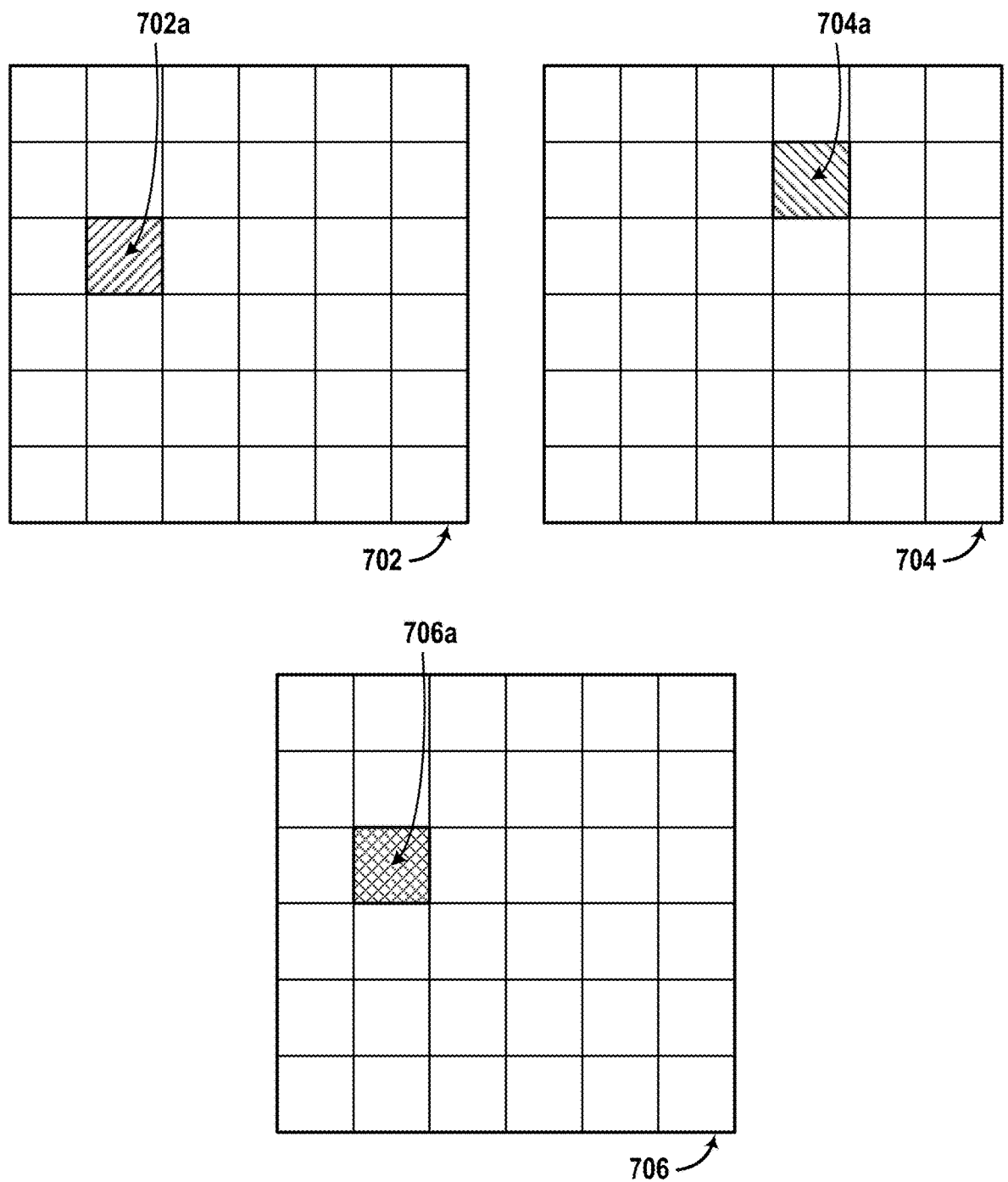
FIG. 7 is a third conceptual illustration of images based on data from one or more rotating sensors, according to example embodiments.

FIG. 7 is a third conceptual illustration of images 702, 704, 706 that are based on data from one or more rotating sensors, according to example embodiments. As shown, images 702, 704 may correspond to grid representations of images captured using a rotating sensor at different times similarly to, respectively, images 602, 604 for example. Further, as shown, image 706 may correspond to a composite image generated based on a sum of image pixel data from at least a first pixel 702a in image 702 and a second pixel 704a from image 704. In the scenario of FIG. 7, an example system may capture pixel 702a (shown in image 702) using a first sensing element (or group of sensing elements) of a rotating image sensor at a first time, and pixel 704a using a second different sensing element (or group) of the rotating image sensor at a second time.

As noted above, in some implementations, an example system may be configured to select which image pixel(s) to add to pixel 702b from image 704 based on a variety of factors in addition to or instead of the rate of rotation of the rotating sensor.

In a first example, the example system may compute an expected pixel location of a point in the imaged object (indicated by pixel 702a) at the second time associated with image 704 based on the rate of rotation of the rotating sensor as well as a configuration of the device that supports the rotating sensor (e.g., tilting direction of rotating platform 210 relative to stationary platform 214, optical characteristics of lens 324, position of image sensor 426 relative to lens 430, etc.). The example system may then operate, at the second time, the particular sensing element (or group of sensing elements) to capture the image pixel data (e.g., pixel 704a) identified based on the computed expected pixel location.

In a second example, the example system may compute the expected pixel location based on a distance between the portion of the object associated with pixel 702a and the rotating sensor(s). For instance, a further object from the image sensor may appear to move less than a closer object after a same amount of rotation of the image sensor. To that end, for instance, the example system can process LIDAR data detected by a LIDAR receiver (e.g., receiver 122) at or within a threshold to the first time when image pixel 702a (and/or image 702) was captured to estimate a distance between the image sensor (or the LIDAR) and the imaged object. The system can then use the estimated distance (as well as an amount of rotation or change in pointing direction (s) of the rotating sensor(s) between the first time and the second time) as a basis to compute an expected apparent motion of the object (or portion thereof) associated with pixel 702a. In turn, the example system may identify the sensing elements of the image sensor associated with image pixel 704a as corresponding, at the second time, to the same object (or portion thereof) indicated by pixel 702a at the first time.

In a third example, the example system may employ a sensor fusion algorithm (or a computer program product storing an algorithm) configured to accept data from the image sensor and/or the LIDAR sensor as an input. The data may include, for example, data from LIDAR 106 and/or camera 108 (e.g., images 702 and/or 704) or any other data representing information sensed by sensors during rotation of the image sensor (and/or LIDAR sensor). The sensor fusion algorithm may include, for example, a Kalman filter, a Bayesian network, an algorithm for some of the functions of the methods herein, or any other algorithm. For instance, the algorithm may identify features/edges of objects in the scanned scene and then match those identified features with features in image 704 to determine that pixel 704a corresponds to the object (or portion thereof) indicated by pixel 702a.

Thus, regardless of the implementation, an example system can combine data from pixel 702a with data from pixel 704a (captured at a different time) to generate pixel 706a of composite image 706, thereby simulating an image pixel captured over a longer exposure time (e.g., sum of exposure times associated with pixels 702a and 704a).

Further, in some implementations, additional pixels captured at subsequent times (and corresponding to the same object or portion thereof indicated by pixel 702a) can be added to pixels 702a and 704a to achieve a further improved image pixel 706a of composite image 706. For instance, an example system may compute multiple locations of the object over time based on the variety of factors described above (e.g., rotation characteristics, LIDAR distance information, optical characteristics of lenses, etc.). In turn, the example system can obtain two, three, or more image pixels (captured at different times) according to the computed path of the apparent motion of the object, as long as the object is expected to remains within the FOV of the imaging sensor (e.g., imaged at any of the image pixels of the plurality of images obtained while the image sensor is rotating).

Figure 8:
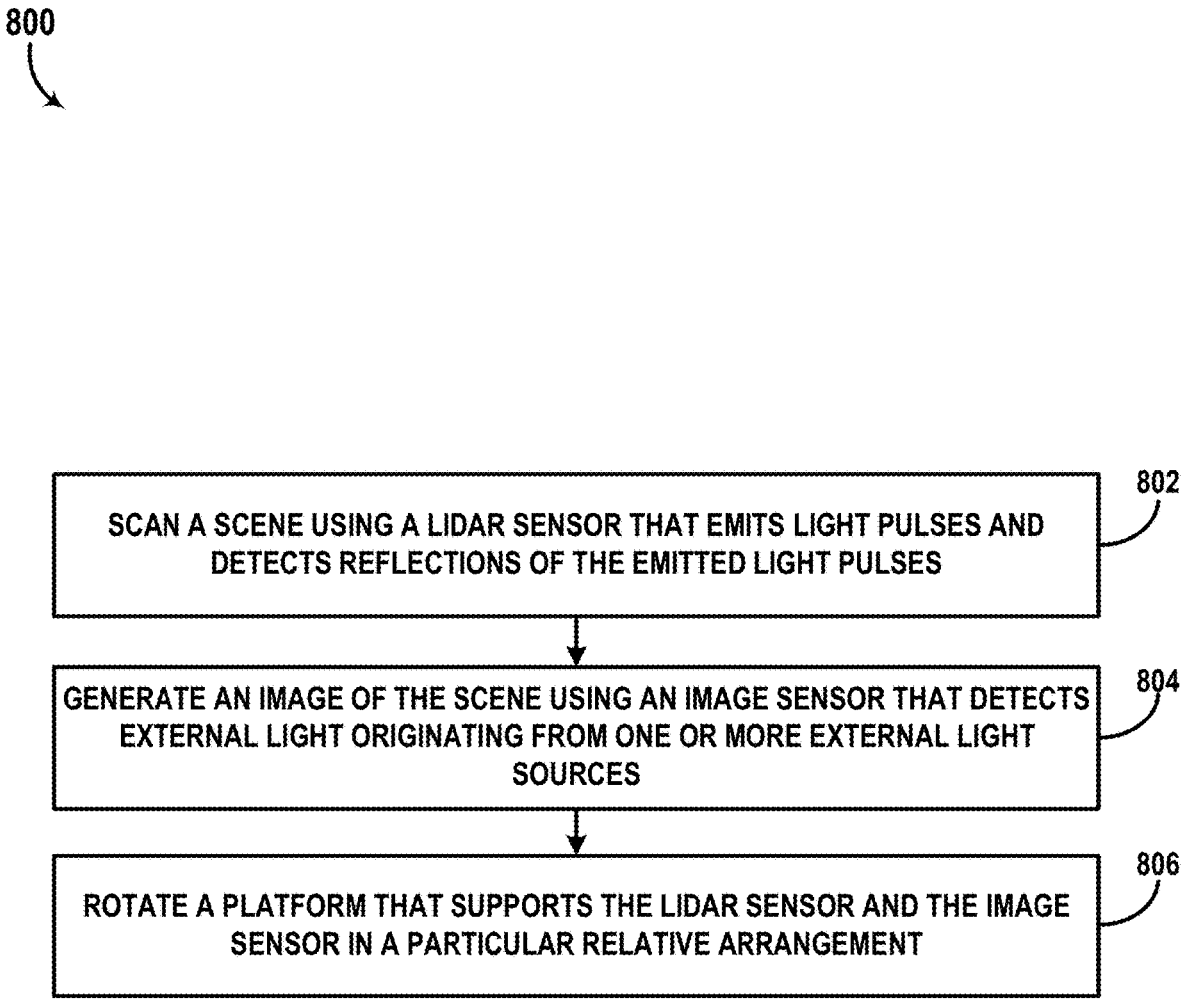
FIG. 8 is a flowchart of a method, according to example embodiments.

FIG. 8 is a flowchart of a method 800, according to example embodiments. Method 800 presents an embodiment of a method that could be used with any of system 100, devices 200, 300, and/or 400, for example. Method 800 may include one or more operations, functions, or actions as illustrated by one or more of blocks 802-806. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for method 800 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for method 800 and other processes and methods disclosed herein, each block in FIG. 8 may represent circuitry that is wired to perform the specific logical functions in the process.

At block 802, method 800 involves scanning a scene using a light detection and ranging (LIDAR) sensor that emits light pulses toward the scene and detects reflections of the emitted light pulses from the scene. For example, LIDAR 206 may be configured to emit light 280 (e.g., in the form of a sequence of pulses) toward the scene, and detect reflected light 290 (e.g., in the form of reflected light pulses, etc.).

At block 804, method 800 involves generating an image of the scene using an image sensor that detects external light originating from one or more external light sources. For example, lens 430 may focus incident light 490 (e.g., which may include external light from external sources such as the sun, street lamps, etc.) onto image sensor 426 to generate an image of object 498 (off which incident light 490 is reflected toward device 400).

At block 806, method 800 involves rotating a platform that supports the LIDAR sensor and the image sensor in a particular relative arrangement. For example, controller 104 may operate actuator 112 to rotate rotating platform 110 about an axis. Further, rotating platform may support LIDAR 106 and camera 108 in a particular relative arrangement, and may thus simultaneously change the respective pointing directions of LIDAR 106 and camera 108. Referring back to FIG. 2 by way of example, LIDAR 206 and camera 208 may be connected to one another such that lenses 224 and 230 have similar (or same) pointing directions, and then rotating platform 210 may simultaneously rotate both LIDAR 206 and camera 208 to simultaneously change their respective pointing directions. As another example, housing 318 of device 300 shown in FIG. 3B mounts LIDAR transmitter 320, LIDAR receiver 322, and image sensor 326 in a particular relative arrangement relative to one another. Thus, as shown in FIG. 3A, rotating platform 310 may rotate housing 318 such that transmitter 320, receiver 322, and image sensor 326 remain in the particular relative arrangement in response to the rotation.

In some implementations, method 800 may involve associating data from a LIDAR receiver (of the LIDAR sensor) with data from the image sensor. In one example, controller 104 can map image pixels indicated by the data from the image sensor to corresponding points in a data cloud indicated by the LIDAR sensor. For instance, controller 104 can cause camera 108 to capture one or more image pixels at particular respective times that are based on emission and/or detection times of the LIDAR light pulses.

Further, in some implementations, method 800 may involve determining a three-dimensional (3D) representation of the scene based on data from the LIDAR receiver and data from the image sensor. For example, system 100 can operate display 140 to render a display of a data point cloud such as an arrangement of points spaced apart based on detected light pulses from the LIDAR sensor.

Further, in some implementations, method 800 may also involve determining a representation of the scene based on distance information indicated by the LIDAR sensor and color information indicated by the image sensor. Continuing with the example above, system 100 can assign colors to one or more points in the point cloud by identifying corresponding image pixels in the data from the image sensor (e.g., based on time of capture of the image pixels, overlapping FOVs of LIDAR 106 and camera 108, feature or edge matching between the LIDAR data and the image sensor data, etc.). System 100 can then update the data point cloud (3D representation) rendered via display 140 to show colored data points according the colors determined using data from the image sensor.

In some implementations, method 800 may involve causing the image sensor to capture a plurality of images while the actuator is rotating the platform. For example, controller 104 can operate camera 106 to capture a sequence of images (e.g., image 502, 504, etc.) while rotating platform 110 (which supports image sensor 126) is rotating.

In these implementations, method 800 may also involve determining a time delay between capture of two consecutive images, and causing the image sensor to capture the plurality of images according to the determined time delay. Referring back to FIG. 5 for example, an example system may determine that pixel locations of imaged star-shaped object in image 502 correspond to pixel locations would be shifted by one column of image pixels in image 504. Thus, for instance, the example system can optionally capture image 502 as a first image at a first time, and image 504 as a second consecutive image at a second time (e.g., without capturing or storing intermediate images associated with a relatively small apparent motion of the imaged object corresponding to less than a distance of one pixel, etc.).

Alternatively or additionally, in these implementations, method 800 may also involve causing the image sensor to capture a given image of the plurality of images at a given time that is based on an emission time (or detection time) of one or more of the emitted light pulses. As such, an example system may improve alignment of LIDAR data from the LIDAR sensor (at least in the time domain) with corresponding image sensor data from the image sensor. As a result, the example system can improve an accuracy of mapping color information from the image sensor to distance information from the LIDAR sensor.

In some implementations, method 800 involves determining a time delay based on a rate of rotation of the platform (that supports the LIDAR sensor and the image sensor in the particular relative arrangement), obtaining a first image pixel captured using a first sensing element in the image sensor, obtaining a second image pixel captured using a second sensing element in the image sensor after passage of the determined time delay from a time when the first image pixel is captured, and determining a particular image pixel of the generated image (at block 804) of the scene based on at least a sum of the first image pixel and the second image pixel.

Referring back to FIG. 7 for example, an example system can use the co-aligned (at least in time domain) LIDAR data associated with image pixel 702a to select and/or identify an expected location, after passage of the determined time delay, of the corresponding image pixel 704a (e.g., due to the rotation at block 806). Then, after passage of the determined time delay from the time when image pixel 702a was captured, the example system can obtain data indicative of image pixel 704a from the appropriate sensing elements that correspond to the location of image pixel 704a. Thus, in these implementations, method 800 may also involve selecting the second sensing element (e.g., sensing element that corresponds to pixel 704a) of the image sensor based on at least distance information associated with the first image pixel and indicated by data from the LIDAR sensor.

IV. EXAMPLE VEHICLES

Some example implementations herein involve a vehicle that includes a sensor system or device, such as system 100, devices 200, 300, and/or 400 for instance. However, an example sensor disclosed herein can also be used for various other purposes and may be incorporated on or otherwise connected to any feasible system or arrangement. For instance, an example sensor system can be used in an assembly line setting to monitor objects (e.g., products) being manufactured in the assembly line. Other examples are possible as well.

Although illustrative embodiments herein include sensor(s) (e.g., co-aligned rotating LIDAR and camera, etc.) mounted on a car, an example sensor arrangement may additionally or alternatively be used on any type of vehicle, including conventional automobiles as well as automobiles having an autonomous or semi-autonomous mode of operation. Thus, the term "vehicle" is to be broadly construed to cover any moving object, including, for instance, an airplane, other flying vehicle, a boat, a truck, a van, a semi-trailer truck, a motorcycle, a golf cart, an off-road vehicle, a warehouse transport vehicle, or a farm vehicle, as well as a carrier that rides on a track such as a rollercoaster, trolley, tram, or train car, among other examples.

Figure 9:
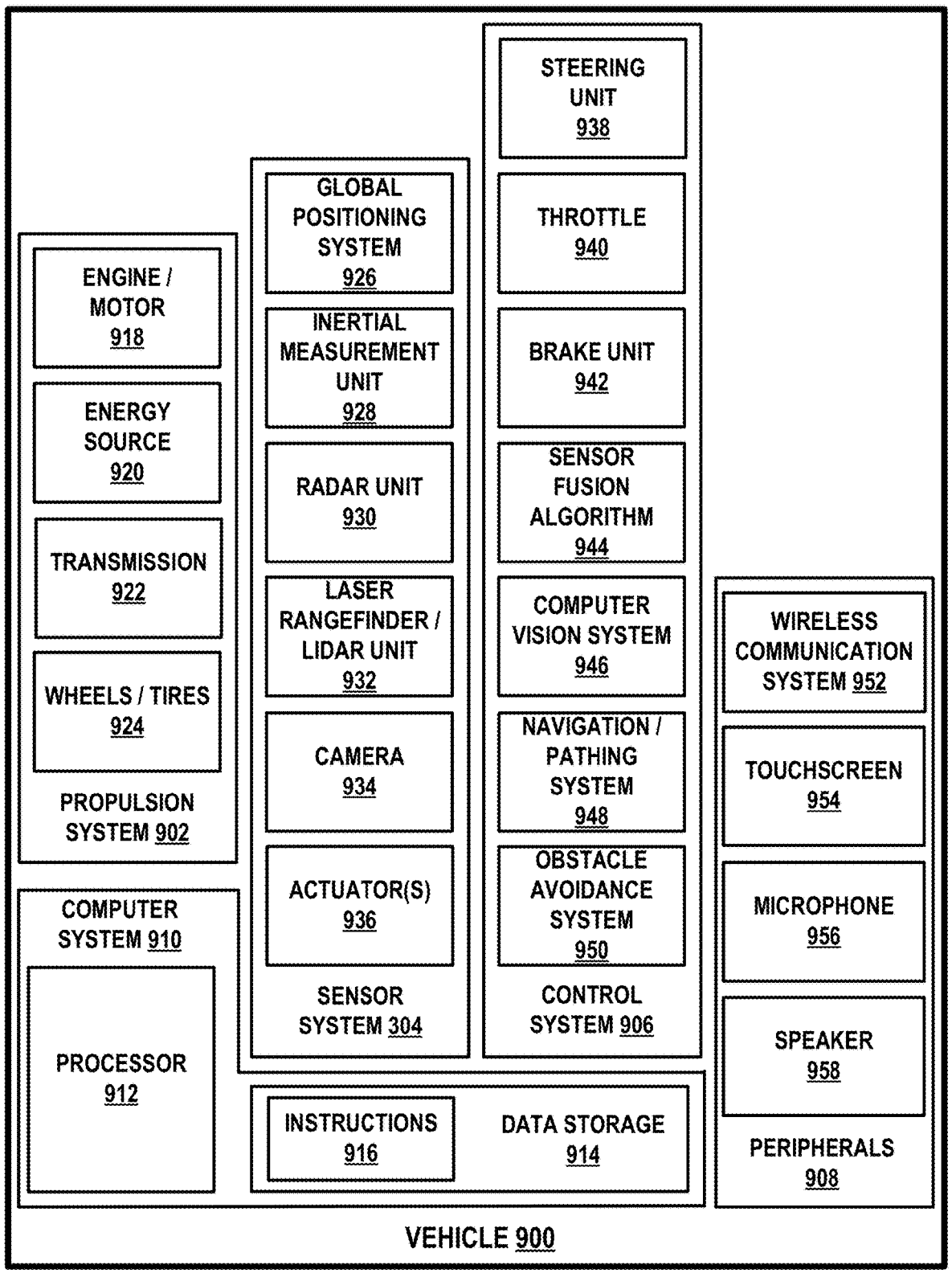
FIG. 9 is a simplified block diagram of a vehicle, according to an example embodiment.

FIG. 9 is a simplified block diagram of a vehicle 900, according to an example embodiment. As shown, vehicle 900 includes a propulsion system 902, a sensor system 904, a control system 906, peripherals 908, and a computer system 910. In some embodiments, vehicle 900 may include more, fewer, or different systems, and each system may include more, fewer, or different components. Additionally, the systems and components shown may be combined or divided in any number of ways. For instance, control system 006 and computer system 910 may be combined into a single system.

Propulsion system 902 may be configured to provide powered motion for the vehicle 900. To that end, as shown, propulsion system 902 includes an engine/motor 918, an energy source 920, a transmission 922, and wheels/tires 924.

Engine/motor 918 may be or include any combination of an internal combustion engine, an electric motor, a steam engine, and a Sterling engine. Other motors and engines are possible as well. In some embodiments, propulsion system 902 may include multiple types of engines and/or motors. For instance, a gas-electric hybrid car may include a gasoline engine and an electric motor. Other examples are possible.

Energy source 920 may be a source of energy that powers the engine/motor 918 in full or in part. That is, engine/motor 918 may be configured to convert energy source 920 into mechanical energy. Examples of energy sources 920 include gasoline, diesel, propane, other compressed gas-based fuels, ethanol, solar panels, batteries, and other sources of electrical power. Energy source(s) 920 may additionally or alternatively include any combination of fuel tanks, batteries, capacitors, and/or flywheels. In some embodiments, energy source 920 may provide energy for other systems of vehicle 900 as well. To that end, energy source 920 may additionally or alternatively include, for example, a rechargeable lithium-ion or lead-acid battery. In some embodiments, energy source 920 may include one or more banks of batteries configured to provide the electrical power to the various components of vehicle 900.

Transmission 922 may be configured to transmit mechanical power from engine/motor 918 to wheels/tires 924. To that end, transmission 922 may include a gearbox, clutch, differential, drive shafts, and/or other elements. In embodiments where the transmission 922 includes drive shafts, the drive shafts may include one or more axles that are configured to be coupled to the wheels/tires 924.

Wheels/tires 924 of vehicle 900 may be configured in various formats, including a unicycle, bicycle/motorcycle, tricycle, or car/truck four-wheel format. Other wheel/tire formats are possible as well, such as those including six or more wheels. In any case, wheels/tires 924 may be configured to rotate differentially with respect to other wheels/tires 924. In some embodiments, wheels/tires 924 may include at least one wheel that is fixedly attached to the transmission 922 and at least one tire coupled to a rim of the wheel that could make contact with the driving surface. Wheels/tires 924 may include any combination of metal and rubber, or combination of other materials. Propulsion system 902 may additionally or alternatively include components other than those shown.

Sensor system 904 may include a number of sensors configured to sense information about an environment in which vehicle 900 is located, as well as one or more actuators 936 configured to modify a position and/or orientation of the sensors. As shown, sensor system 904 includes a Global Positioning System (GPS) 926, an inertial measurement unit (IMU) 928, a RADAR unit 930, a laser rangefinder and/or LIDAR unit 932, and a camera 934. Sensor system 904 may include additional sensors as well, including, for example, sensors that monitor internal systems of vehicle 900 (e.g., an $O_2$ monitor, a fuel gauge, an engine oil temperature, etc.). Other sensors are possible as well.

GPS 926 may be any sensor (e.g., location sensor) configured to estimate a geographic location of vehicle 900. To this end, the GPS 926 may include a transceiver configured to estimate a position of vehicle 900 with respect to the Earth.

IMU 928 may be any combination of sensors configured to sense position and orientation changes of vehicle 900 based on inertial acceleration. The combination of sensors may include, for example, accelerometers, gyroscopes, compasses, etc.

RADAR unit 930 may be any sensor configured to sense objects in the environment in which vehicle 900 is located using radio signals. In some embodiments, in addition to sensing the objects, RADAR unit 930 may additionally be configured to sense the speed and/or heading of the objects.

Similarly, laser range finder or LIDAR unit 932 may be any sensor configured to sense objects in the environment in which vehicle 900 is located using lasers. For example, LIDAR unit 932 may include one or more LIDAR devices, at least some of which may take the form of the LIDARS described in system 100, devices 200, 300, and/or 400 among other LIDAR device configurations.

Camera 934 may be any camera (e.g., a still camera, a video camera, etc.) configured to capture images of the environment in which vehicle 900 is located. To that end, camera 934 may take any of the forms described above. For example, camera 934 may include an image sensor and may take the form of any of the image sensors/cameras describedin system 100, devices 200, 300, and/or 400 among other camera configurations.

Control system 906 may be configured to control one or more operations of vehicle 900 and/or components thereof. To that end, control system 906 may include a steering unit 938, a throttle 940, a brake unit 942, a sensor fusion algorithm 944, a computer vision system 946, navigation or pathing system 948, and an obstacle avoidance system 950.

Steering unit 938 may be any combination of mechanisms configured to adjust the heading of vehicle 900. Throttle 940 may be any combination of mechanisms configured to control engine/motor 918 and, in turn, the speed of vehicle 900. Brake unit 942 may be any combination of mechanisms configured to decelerate vehicle 900. For example, brake unit 942 may use friction to slow wheels/tires 924. As another example, brake unit 942 may convert kinetic energy of wheels/tires 924 to an electric current.

Sensor fusion algorithm 944 may be an algorithm (or a computer program product storing an algorithm) configured to accept data from sensor system 904 as an input. The data may include, for example, data representing information sensed by sensor system 904. Sensor fusion algorithm 944 may include, for example, a Kalman filter, a Bayesian network, a machine learning algorithm, an algorithm for some of the functions of the methods herein (e.g., method 800, etc.), or any other sensor fusion algorithm. Sensor fusion algorithm 944 may further be configured to provide various assessments based on the data from sensor system 904, including, for example, evaluations of individual objects and/or features in the environment in which vehicle 900 is located, evaluations of particular situations, and/or evaluations of possible impacts based on particular situations. Other assessments are possible as well.

Computer vision system 946 may be any system configured to process and analyze images captured by camera 934 in order to identify objects and/or features in the environment in which vehicle 900 is located, including, for example, traffic signals and obstacles. To that end, computer vision system 946 may use an object recognition algorithm, a Structure from Motion (SFM) algorithm, video tracking, or other computer vision techniques. In some embodiments, computer vision system 946 may additionally be configured to map the environment, track objects, estimate the speed of objects, etc.

Navigation and pathing system 948 may be any system configured to determine a driving path for vehicle 900. Navigation and pathing system 948 may additionally be configured to update a driving path of vehicle 900 dynamically while vehicle 900 is in operation. In some embodiments, navigation and pathing system 948 may be configured to incorporate data from sensor fusion algorithm 944, GPS 926, LIDAR unit 932, and/or one or more predetermined maps so as to determine a driving path for vehicle 900.

Obstacle avoidance system 950 may be any system configured to identify, evaluate, and avoid or otherwise negotiate obstacles in the environment in which vehicle 900 is located. Control system 906 may additionally or alternatively include components other than those shown.

Peripherals 908 may be configured to allow vehicle 300 to interact with external sensors, other vehicles, external computing devices, and/or a user. To that end, peripherals 908 may include, for example, a wireless communication system 952, a touchscreen 954, a microphone 956, and/or a speaker 958.

Wireless communication system 952 may be any system configured to wirelessly couple to one or more other vehicles, sensors, or other entities, either directly or via a communication network. To that end, wireless communication system 952 may include an antenna and a chipset for communicating with the other vehicles, sensors, servers, or other entities either directly or via a communication network. The chipset or wireless communication system 952 in general may be arranged to communicate according to one or more types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities.

Touchscreen 954 may be used by a user to input commands to vehicle 900. To that end, touchscreen 954 may be configured to sense at least one of a position and a movement of a user's finger via capacitive sensing, resistance sensing, or a surface acoustic wave process, among other possibilities. Touchscreen 954 may be capable of sensing finger movement in a direction parallel or planar to the touchscreen surface, in a direction normal to the touchscreen surface, or both, and may also be capable of sensing a level of pressure applied to the touchscreen surface. Touchscreen 954 may be formed of one or more translucent or transparent insulating layers and one or more translucent or transparent conducting layers. Touchscreen 954 may take other forms as well.

Microphone 956 may be configured to receive audio (e.g., a voice command or other audio input) from a user of vehicle 900. Similarly, speakers 358 may be configured to output audio to the user.

Computer system 910 may be configured to transmit data to, receive data from, interact with, and/or control one or more of propulsion system 902, sensor system 904, control system 906, and peripherals 908. To this end, computer system 910 may be communicatively linked to one or more of propulsion system 902, sensor system 904, control system 906, and peripherals 908 by a system bus, network, and/or other connection mechanism (not shown).

In a first example, computer system 910 may be configured to control operation of transmission 922 to improve fuel efficiency. In a second example, computer system 910 may be configured to cause camera 934 to capture images of the environment. In a third example, computer system 910 may be configured to store and execute instructions corresponding to sensor fusion algorithm 944. In a fourth example, computer system 910 may be configured to store and execute instructions for determining a 3D representation of the environment around vehicle 900 using LIDAR unit 932. In a fifth example, computer system 910 may be configured to operate two co-aligned rotating sensors (e.g., LIDAR 932 and camera 934, etc.) synchronously and combine information from the two sensors (e.g., color information from camera 934 and depth information from LIDAR 932), in line the discussion above for controller 104 of system 100. Other examples are possible as well.

As shown, computer system 910 includes processor 912 and data storage 914. Processor 912 may comprise one or more general-purpose processors and/or one or more special-purpose processors. To the extent that processor 912 includes more than one processor, such processors could work separately or in combination.

Data storage 914, in turn, may comprise one or more volatile and/or one or more non-volatile storage components, such as optical, magnetic, and/or organic storage, and data storage 914 may be integrated in whole or in part with processor 912. In some embodiments, data storage 914 may contain instructions 916 (e.g., program logic) executable by processor 912 to cause vehicle 900 and/or components thereof to perform the various operations described herein. Data storage 914 may contain additional instructions as well, including instructions to transmit data to, receive data from, interact with, and/or control one or more of propulsion system 902, sensor system 904, control system 906, and/or peripherals 908.

In some embodiments, vehicle 900 may include one or more elements in addition to or instead of those shown. In one example, vehicle 900 may include one or more additional interfaces and/or power supplies. In another example, vehicle 900 may include system 100, devices 200, 300, and/or 400 in addition to or instead of one or more of the components shown. In such embodiments, data storage 914 may also include instructions executable by processor 912 to control and/or communicate with the additional components. Still further, while each of the components and systems are shown to be integrated in vehicle 900, in some embodiments, one or more components or systems may be removably mounted on or otherwise connected (mechanically or electrically) to vehicle 900 using wired or wireless connections. Vehicle 900 may take other forms as well.

Figure 10A:
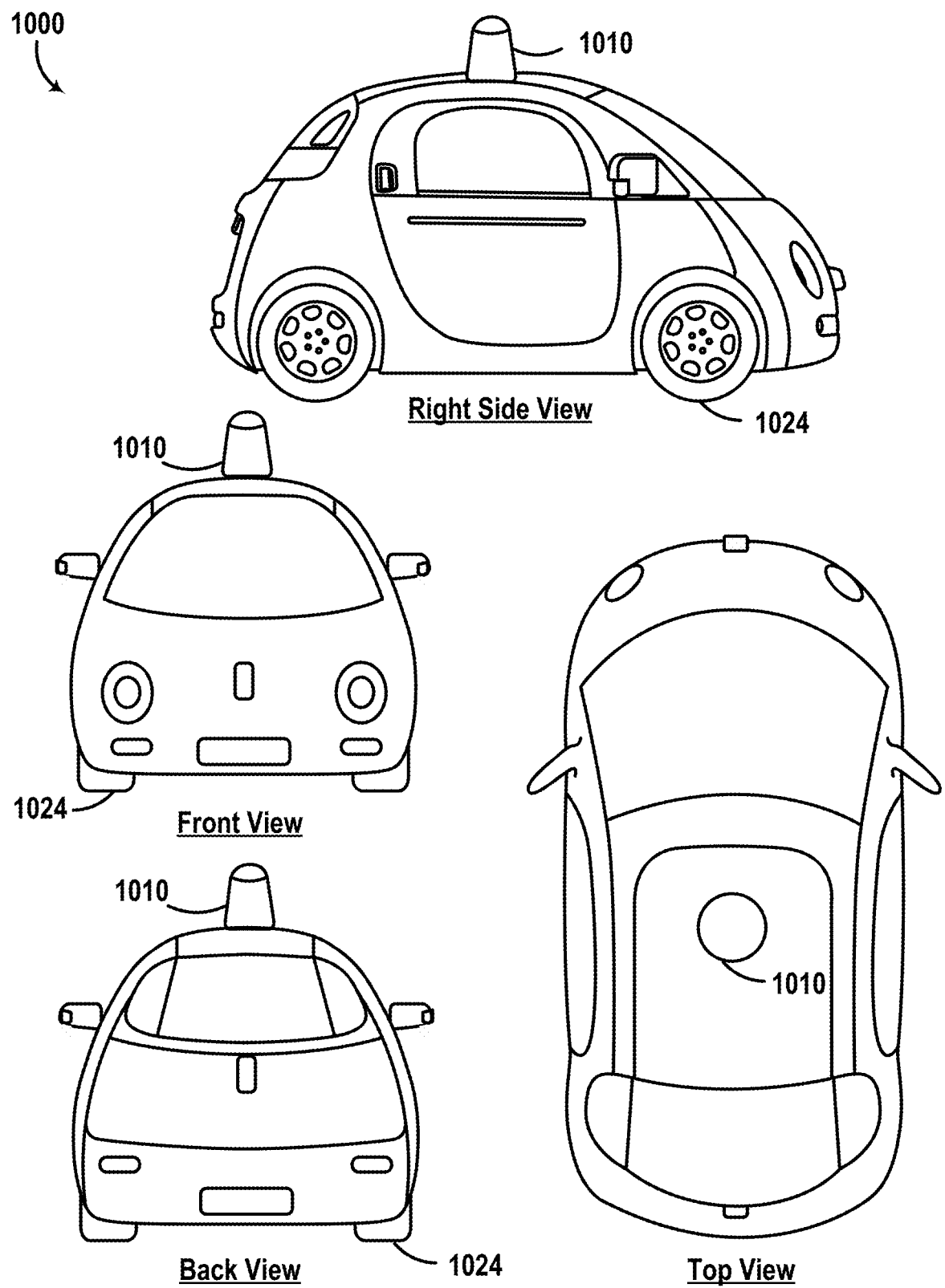
FIG. 10A illustrates several views of a vehicle equipped with a sensor system, according to an example embodiment.
Figure 10B:
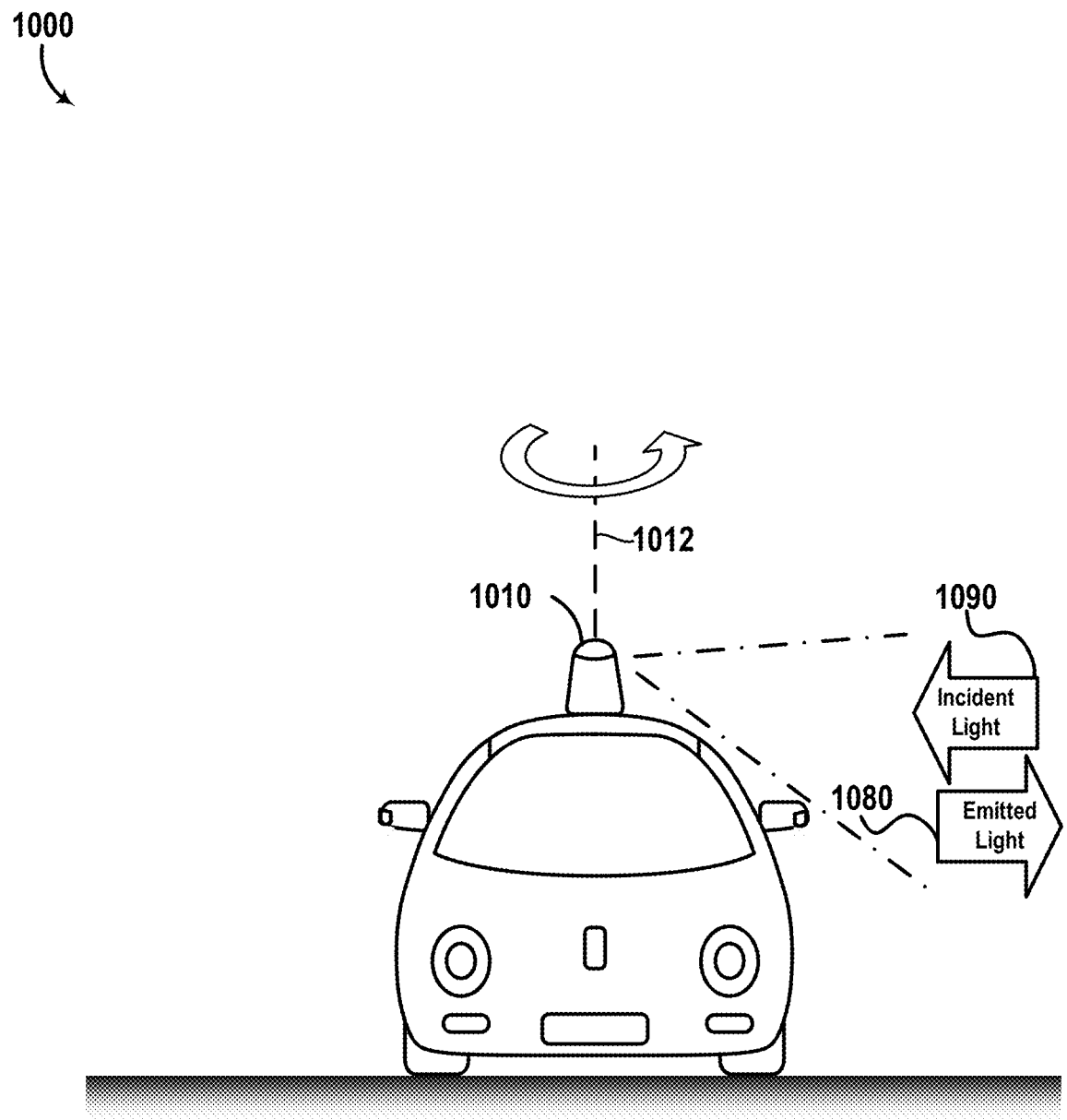
FIG. 10B illustrates an example operation of the sensor system.

FIGS. 10A-10B collectively illustrate a vehicle 1000 equipped with sensor system 1004, according to example embodiments. Vehicle 1000 may be similar to vehicle 900, for example. Although vehicle 1000 is illustrated as a car, as noted above, other types of vehicles are possible. Furthermore, although vehicle 1000 may be configured to operate in autonomous mode, the embodiments described herein are also applicable to vehicles that are not configured to operate autonomously.

FIG. 10A shows a Right Side View, Front View, Back View, and Top View of vehicle 1000. As shown, vehicle 1000 includes a sensor system 1010 mounted on a top side of vehicle 1000 opposite a bottom side on which wheels of vehicle 1000, exemplified by wheel 1024, are located. Wheel 1024 may be similar to wheel(s) 924, for example.

Sensor system 1010 may be similar to or include system 100, devices 200, 300, 400, and/or sensor system 904. For example, sensor system 1010 may include an arrangement of co-aligned rotating sensors, such as LIDAR 106 and camera 108 of system 100 for instance. Although sensor system 1010 is shown and described as being positioned on a top side of vehicle 1000, system 1010 could be alternatively positioned on any other part of vehicle 1000, including any other side of vehicle 1000 for instance.

FIG. 10B shows that sensor system 1010 may be configured to scan an environment around vehicle 1000 by rotating about vertical axis 1012. For example, system 1010 may include a LIDAR (e.g., LIDAR 106, etc.) that is rotated while emitting one or more light pulses and detecting reflected light pulses off objects in an environment of vehicle 1000, for example. Further, for example, system 1010 may include a camera (e.g., camera 108, etc.) or other image sensor that is rotated with the LIDAR, in line with the discussion above.

Thus, as shown, a LIDAR of system 1010 may emit light 1080 (e.g., similarly to emitted light 380, etc.) in a pointing direction of system 1010, which is shown as a pointing direction toward a right side of the page for example. With this arrangement, the LIDAR of system 1010 can emit light 1080 toward regions of the environment that are relatively close to the vehicle (e.g., a lane marker) as well as toward regions of the environment that are further away from the vehicle (e.g., a road sign ahead of the vehicle). The LIDAR of system 1010 may also include a receiver that detects reflections of the emitted light (e.g., included in incident light 1090). Further, system 1010 may include a co-aligned camera that receives a portion of incident light 1090 (e.g., external light, etc.) from a same or at least partially overlapping FOV as the LIDAR.

Further, vehicle 1000 can rotate system 1010 (e.g., the co-aligned LIDAR and camera arrangement) about axis 1012 to change the pointing directions of the sensors in system 1010 (e.g., LIDAR and camera) simultaneously. In one example, vehicle 1000 may rotate system 1010 about axis 1012 repeatedly for complete rotations. In this example, for each complete rotation of system 1010 (or one or more components thereof), system 1010 can scan a 360° FOV around vehicle 1000. In another example, vehicle 1000 may rotate system 1010 about axis 1012 for less than a complete rotation (e.g., to scan a limited horizontal FOV rather than a complete 360° FOV).

V. CONCLUSION

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures. Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations.

What is claimed is:

1. A method, comprising:
   generating, using a light detection and ranging (lidar) sensor of a vehicle, a unit of sensing data comprising a direction and a distance to a reflective feature in an external scene;
   capturing, using a camera sensor, a plurality of laterally offset images of the external scene, wherein a first image of the plurality of laterally offset images of the external scene is captured at a first time;
   mapping, based at least on a scanning frequency associated with capturing the plurality of laterally offset images using the camera sensor, a first region of the first image to the unit of sensing data, wherein the first region depicts the reflective feature;
   obtaining an augmented unit of sensing data, wherein obtaining the augmented unit of sensing data comprises:
   fusing the unit of sensing data with the first region of the first image; and
   delivering the augmented unit of sensing data to a navigation and pathing system of the vehicle.

2. The method of claim 1, wherein mapping the first region of the first image to the unit of sensing data is performed in further view of a difference between an exposure time of the lidar sensor and an exposure time of the camera sensor.

3. The method of claim 1, wherein the first region of the first image is associated with a plurality of spectral values, wherein each of the plurality of spectral values is associated with a respective spectral portion of light captured by the camera sensor.

4. The method of claim 1, further comprising:
   capturing, using the camera sensor, a second image of the plurality of laterally offset images of the external scene at a second time,
   wherein obtaining the augmented unit of sensing data further comprises:
   mapping, based at least on a difference between the second time and the first time, a second region of the second image to the first region of the first image, wherein the second region depicts the reflective feature; and
   fusing the unit of sensing data and the first region of the first image with the second region of the second image.

5. The method of claim 4, wherein mapping the second region of the second image to the first region of the first image is performed in further view of the scanning frequency of the camera sensor.

6. The method of claim 4, wherein mapping the second region of the second image to the first region of the first image is performed in view of depictions of the reflective feature in the first image and in the second image.

7. The method of claim 4, wherein mapping the second region of the second image to the first region of the first image is performed in view of the distance to the reflective feature.

8. The method of claim 1, further comprising:
   using the augmented unit of sensing data to determine a driving path for the vehicle.

9. The method of claim 1, wherein the lidar sensor and the camera sensor are rotated around a common axis.

10. A system, comprising:
- a light detection and ranging (lidar) sensor configured to generate a unit of sensing data comprising a direction and a distance to a reflective feature in an external scene;
- a camera sensor configured to capture a first image of a plurality of laterally offset images of the external scene, wherein the first image is captured at a first time; and
- a controller configured to:
  - map, based at least on a scanning frequency associated with capturing the plurality of laterally offset images by the camera sensor, a first region of the first image to the unit of sensing data in view of a scanning frequency of the camera sensor, wherein the first region depicts the reflective feature;
  - obtain an augmented unit of sensing data by fusing the unit of sensing data with the first region of the first image; and
  - deliver the augmented unit of sensing data to a navigation and pathing system of a vehicle.

11. The system of claim 10, wherein the controller is configured to map the first region of the first image to the unit of sensing data in further view of a difference between an exposure time of the lidar sensor and an exposure time of the camera sensor.

12. The system of claim 10, wherein the first region of the first image is associated with a plurality of spectral values, wherein each of the plurality of spectral values is associated with a respective spectral portion of light captured the camera sensor.

13. The system of claim 10, wherein the camera sensor is further configured to:
- capture a second image of the plurality of laterally offset images of the external scene, wherein the second image is captured at a second time, and wherein to obtain the augmented unit of sensing data, the controller is further configured to:
  - map, based at least on a difference between the second time and the first time, a second region of the second image to the first region of the first image, wherein the second region depicts the reflective feature; and
  - fuse the unit of sensing data and the first region of the first image with the second region of the second image.

14. The system of claim 13, wherein the controller is configured to map the second region of the second image to the first region of the first image in further view of the scanning frequency of the camera sensor.

15. The system of claim 13, wherein the controller is configured to map the second region of the second image to the first region of the first image in view of depictions of the reflective feature in the first image and in the second image.

16. The system of claim 13, wherein the controller is configured to map the second region of the second image to the first region of the first image in view of the distance to the reflective feature.

17. The system of claim 13, wherein the controller is configured to map the second region of the second image to the first region of the first image in view of the distance to the reflective feature.

18. The system of claim 13, wherein the lidar sensor and the camera sensor are rotated around a common axis.

19. A non-transitory computer readable medium having stored therein instructions executable by a computing device to cause the computing device to:
- generate, using a light detection and ranging (lidar) sensor of a vehicle, a unit of sensing data comprising a direction and a distance to a reflective feature in an external scene;
- capture, using a camera sensor, a plurality of laterally offset images of the external scene, wherein a first image of the plurality of laterally offset images of the external scene is captured at a first time;
- map, based at least on a scanning frequency associated with capturing the plurality of laterally offset images using the camera sensor, a first region of the first image to the unit of sensing data, wherein the first region depicts the reflective feature;
- obtain an augmented unit of sensing data by fusing the unit of sensing data with the first region of the first image;
- deliver the augmented unit of sensing data to a navigation and pathing system of the vehicle; and
- cause the navigation and pathing system of the vehicle to determine a driving path for the vehicle in view of the augmented unit of sensing data.

20. The method of claim 4, wherein fusing the unit of sensing data and the first region of the first image with the second region of the second image comprises:
- adding data collected for the first region of the first image with data collected for the second region of the second image.

21. The system of claim 13, wherein to fuse the unit of sensing data and the first region of the first image with the second region of the second image, the camera sensor is configured to:
- add data collected for the first region of the first image with data collected for the second region of the second image.

* * * * *